(12) United States Patent
Nishijima et al.

(10) Patent No.: US 11,255,703 B2
(45) Date of Patent: Feb. 22, 2022

(54) ROTATION ANGLE DETECTION DEVICE HAVING INCREASED ACCURACY

(71) Applicant: Mitsubishi Electric Corporation, Tokyo (JP)

(72) Inventors: Yoshimasa Nishijima, Tokyo (JP); Masahiro Iezawa, Tokyo (JP); Shinji Nishimura, Tokyo (JP); Ryosuke Shigematsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/959,306

(22) PCT Filed: Jan. 11, 2018

(86) PCT No.: PCT/JP2018/000459
§ 371 (c)(1),
(2) Date: Jun. 30, 2020

(87) PCT Pub. No.: WO2019/138491
PCT Pub. Date: Jul. 18, 2019

(65) Prior Publication Data
US 2020/0370926 A1 Nov. 26, 2020

(51) Int. Cl.
*G01D 5/244* (2006.01)
*G01B 7/30* (2006.01)

(52) U.S. Cl.
CPC ............ *G01D 5/2448* (2013.01); *G01B 7/30* (2013.01)

(58) Field of Classification Search
None
See application file for complete search history.

(56) References Cited

U.S. PATENT DOCUMENTS 5,250,889 A 10/1993 Ezuka
2006/0113949 A1* 6/2006 Nishimura ............. H02K 19/36
318/723
(Continued)

FOREIGN PATENT DOCUMENTS

JP 2014-228413 A 12/2014

OTHER PUBLICATIONS

International Search Report for PCT/JP2018/000459 dated Apr. 10, 2018 (PCT/ISA/210).
(Continued)

*Primary Examiner* — Douglas X Rodriguez
(74) *Attorney, Agent, or Firm* — Sughrue Mion, PLLC; Richard C. Turner

(57) ABSTRACT

A rotation angle detection device for accurately detecting a rotation angle is obtained even when electromagnetic noise due to an electrical component(s) and the like of an electric automotive vehicle is superimposed on detection signals of the rotation angle detection device. The device includes a multi-phase/two-phase transformation unit for converting a plurality of detection signals, each being outputted from rotation detectors in accordance with a rotation angle of a rotating body so as to output transformed signals as two-phase signals; an addition-subtraction calculation unit for generating addition-subtraction signals by mutually performing addition to the two-phase signals and subtraction therefrom; an amplitude correction unit for modifying amplitudes of the addition-subtraction signals in accordance with an amplitude correction value, and for outputting post-correction addition-subtraction signals; and an angle calculation unit for calculating an angle based on the post-correction addition-subtraction signals, and for outputting an angular signal.

6 Claims, 17 Drawing Sheets

(56) References Cited

U.S. PATENT DOCUMENTS

2014/0347040 A1* 11/2014 Kawase ............... G01D 5/2448
324/207.12
2017/0317682 A1* 11/2017 Shimizu .................... H02P 6/16

OTHER PUBLICATIONS

Communication dated Aug. 31, 2021 from The Sate Intellectual Property Office of P.R. of China in Machine Application No. 201880085565.0, 16 pages with translation Translation.

* cited by examiner

MECHANICAL ANGLE

US 11,255,703 B2

ROTATION ANGLE DETECTION DEVICE HAVING INCREASED ACCURACY

This application is a National Stage of International Application No. PCT/JP2018/000459 filed Jan. 11, 2018.

TECHNICAL FIELD

The present invention relates to a rotation angle detection device for calculating a rotation angle of a rotational shaft, and in particular to a rotation angle detection device utilizing changes in magnetic intensity.

BACKGROUND ART

In recent years, in order to reduce the environmental load of motor vehicles, electric motor operations of a motor vehicle using an electric motor have been underway for driving the motor vehicle. In such an electric automotive vehicle, it is required to accurately detect a rotation angle of the electric motor, and to secure driving capability of the motor vehicle. As for a rotation angle detection device, its high accuracy in a rotation angle is demanded to be maintained even when there exist variations in its assembling.

As a rotation angle detection method for inexpensively and accurately detecting a rotation angle of an electric motor's rotational shaft without performing a calibration process(es) of output signals after assembling a rotation angle detection device, a rotation angle detection device is disclosed, for example, in Patent Document 1 which includes: an amplitude adjustment means for performing modification, with respect to detection signals each being outputted from a plurality of rotation detection means which is disposed in a state to output the detection signals whose outputs change in accordance with a rotation angle of a rotating body and also whose phases are different from one another, on amplitude values of the plurality of detection signals to make coincident with one another so as to be outputted as modification signals; vector generation means for mutually performing addition to and subtraction from two modification signals among the plurality of modification signals, and for producing two vector component signals perpendicular to each other; an amplitude modification means for performing modification to make the amplitudes of the two vector component signals coincident with each other, and for outputting modified signals as post-modification vector signals; and rotation angle search means for outputting a detection angle by searching a rotation angle of the rotating body, based on a vector expressed by the two post-modification vector signals.

RELATED ART DOCUMENT

Patent Document

[Patent Document 1] Japanese Laid-Open Patent Publication No. 2014-228413

SUMMARY OF THE INVENTION

Problems to be Solved by the Invention

In a rotation angle detection device of Patent Document 1, it is so arranged that: modification is performed on amplitude values of detection signals, whose outputs change in accordance with a rotation angle of a rotating body and also whose phases are different from one another, to make coincident with one another, so that modification signals are made; among the modification signals, two of them are added to and subtracted from each other, and two vector component signals perpendicular to each other are produced; and a rotation angle is calculated by using post-modification vector signals on which modification is performed to make the amplitudes of the two vector component signals coincident with each other. For this reason, when the rotation angle detection device of Patent Document 1 is applied as it is to an electric automotive vehicle, electromagnetic noise due to an electrical component(s) and the like, such as an electric motor inside of the vehicle, an inverter for driving the electric motor and the like, is superimposed on the detection signals; and so, there arises a problem in that an influence of errors due to electromagnetic noise is kept remaining on modification values for conforming amplitude values, and on their post-modification vector signals, so that an accurate rotation angle cannot be obtained.

The present invention has been directed at solving those problems described above, and an object of the invention is to obtain a rotation angle detection device for accurately detecting a rotation angle, even when electromagnetic noise due to an electrical component(s) and the like of an electric automotive vehicle is superimposed on detection signals of the rotation angle detection device.

Means for Solving the Problems

A rotation angle detection device according to the present invention comprises: a multi-phase/two-phase transformation unit for converting a plurality of detection signals, each being outputted from rotation detectors in accordance with a rotation angle of a rotating body, so as to output transformed signals as two-phase signals; an addition-subtraction calculation unit for generating addition-subtraction signals by mutually performing addition to the two-phase signals and subtraction therefrom; an amplitude correction unit for modifying amplitudes of the addition-subtraction signals in accordance with an amplitude correction value, and for outputting post-correction addition-subtraction signals; and an angle calculation unit for calculating an angle based on the post-correction addition-subtraction signals, and for outputting an angular signal.

Effects of the Invention

According to the present invention, a rotation angle can be accurately detected, even when electromagnetic noise due to an electrical component(s) and the like of an electric automotive vehicle is superimposed on detection signals of the rotation angle detection device.

EMBODIMENTS FOR CARRYING OUT THE INVENTION

Figure 1:
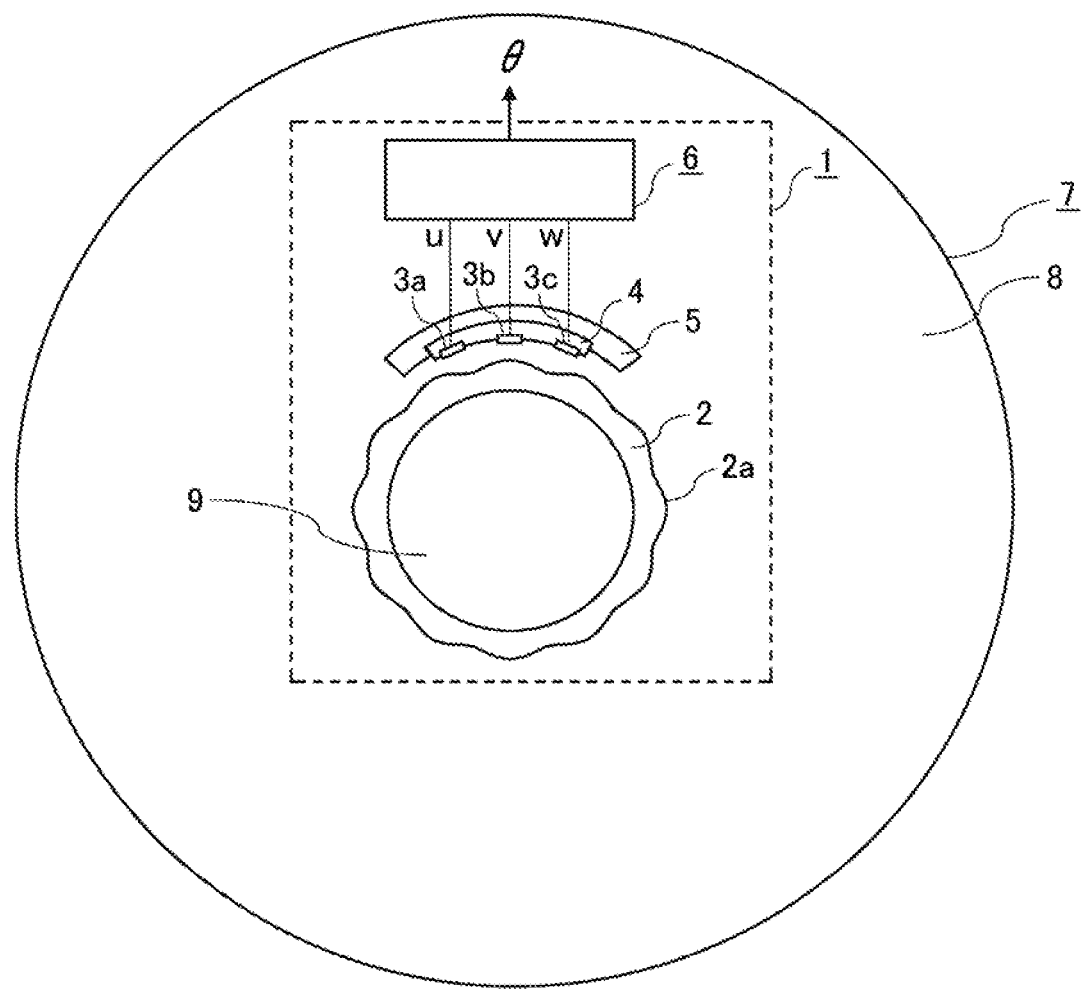
FIG. 1 is a schematic diagram illustrating a rotation angle detection device according to Embodiment 1 of the present invention.

Hereinafter, the explanation will be made referring to the drawings for preferred embodiments of rotation angle detection devices according to the present invention. Note that, in each of the figures, the explanation will be made for the same or corresponding items, portions or parts by designating the same reference numerals and symbols.

Embodiment 1

FIG. 1 is a schematic diagram illustrating a configuration of a rotation angle detection device 1 according to Embodiment 1. An electric motor 7 includes a rotating body 9 which rotates while being supported by means of a housing 8 having bearings thereinside which are omitted to show in the figure. A rotor 2 is mounted on the rotating body 9; and formed on the outer circumference of the rotor 2 are convex and concave sections 2a having shapes changing in curves so that the detection signals by rotation detectors 3a, 3b and 3c (these are also referred to collectively as "rotation detectors or detection-members"), each utilizing a magnetic detection element, give the shapes of sinusoidal waves in accordance with a rotation angle of the rotating body 9. In FIG. 1, the convex and concave sections 2a are in the number of twelve ("x"=12); and thus, when the rotor 2 rotates at a mechanical angle of 360 degrees, namely, in one revolution, the quantities of twelve periods of waveforms are individually obtained from the rotation detectors 3a, 3b and 3c. In FIG. 1, per one period of the convex and concave sections 2a, three of the rotation detectors 3a, 3b and 3c are mounted, for example. In addition, with respect to one period of the convex and concave sections 2a each, three (b=3) of the rotation detectors 3a, 3b and 3c are placed in approximately the same or identical intervals therebetween; and thus, when the one period of the convex and concave sections 2a each gives 360 degrees, signals each having a phase difference of 120 degrees from one another are outputted from the three rotation detectors 3a, 3b and 3c. Note that, it is only necessary that such a convex and concave section 2a is formed for the quantity of "x" period(s) with respect to a mechanical angle of 360 degrees, where symbol "x" is an integer of one or more. Moreover, it is only necessary that such rotation detectors 3a, 3b and 3c are provided for a number of "b" with respect to one period of the convex and concave sections 2a, where symbol "b" is an integer of three or more. Each of the rotation detectors 3a, 3b and 3c is individually mounted, on a side of a stator 5, with a bias magnetic field generator omitted to show in the figure. As for the bias magnetic field generator, a permanent magnet is utilized in Embodiment 1.

Detection signals u, v and w from the respective rotation detectors 3a, 3b and 3c are inputted into a signal processing device 6, and the detection signals u, v and w are processed by the signal processing device 6, so that an angular signal θ is outputted from the signal processing device 6 into an electric motor driving apparatus omitted to show in the figure.

Figure 2:
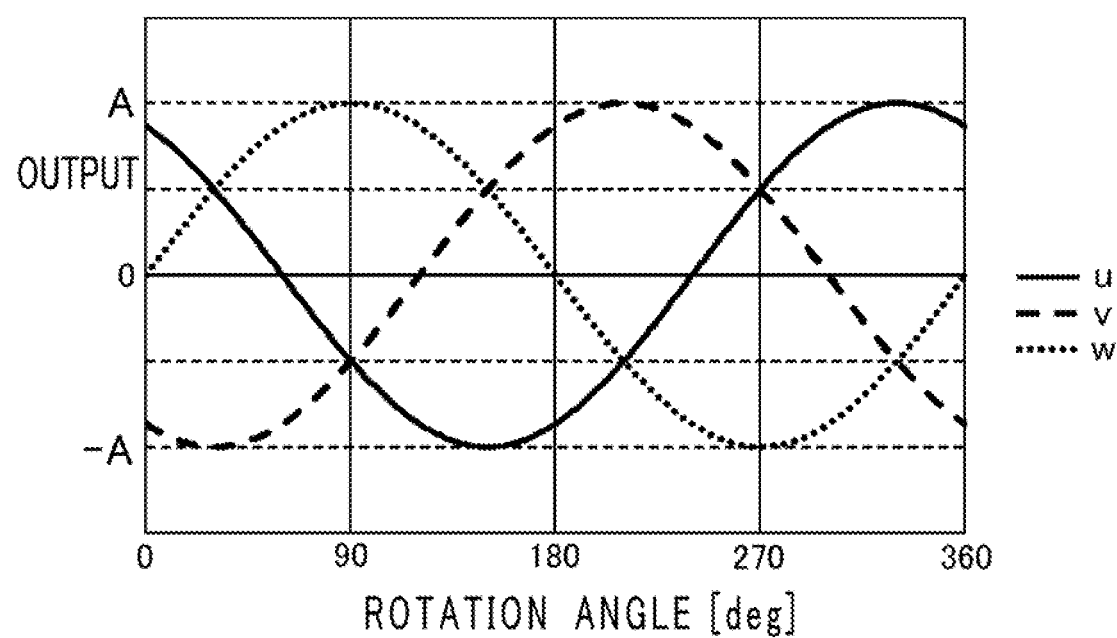
FIG. 2 is a diagram illustrating an example of ideal detection signals in the rotation angle detection device according to Embodiment 1 of the present invention.

In an ideal case in which there exists no variation in magnetization of the bias magnetic field generators each being a permanent magnet, there exists no variation in sensitivity of the rotation detectors 3a, 3b and 3c each, and further, there exists no error factor such as a mounting error or the like of the rotation detectors 3a, 3b and 3c each, ideal detection signals are outputted as shown in FIG. 2, and as indicated in Expression (1).

[Expression FIG. 1]

$$u = A \cdot \sin(\theta_r) + d$$

$$v = A \cdot \sin(\theta_r + \tfrac{2}{3}\pi) + d$$

$$w = A \cdot \sin(\theta_r + \tfrac{4}{3}\pi) + d \qquad (1)$$

Here, symbol "A" designates an ideal amplitude of detection signals u, v and w each in an ideal case in which there exists no variation in magnetization of bias magnetic field generators each being a permanent magnet, there exists no variation in sensitivity of the rotation detectors 3a, 3b and 3c each, and further, there exists no error factor such as a mounting error or the like of the rotation detectors 3a, 3b and 3c each; symbol "θ$_r$," an angle of the rotating body 9; and symbol "d," an ideal DC-offset value of the detection signals u, v and w each in an ideal case in which there exists no variation in magnetization of the bias magnetic field generators each being a permanent magnet, there exists no variation in sensitivity of the rotation detectors 3a, 3b and 3c each, and further, there exists no error factor such as a mounting error or the like of the rotation detectors 3a, 3b and 3c each.

Figure 3:
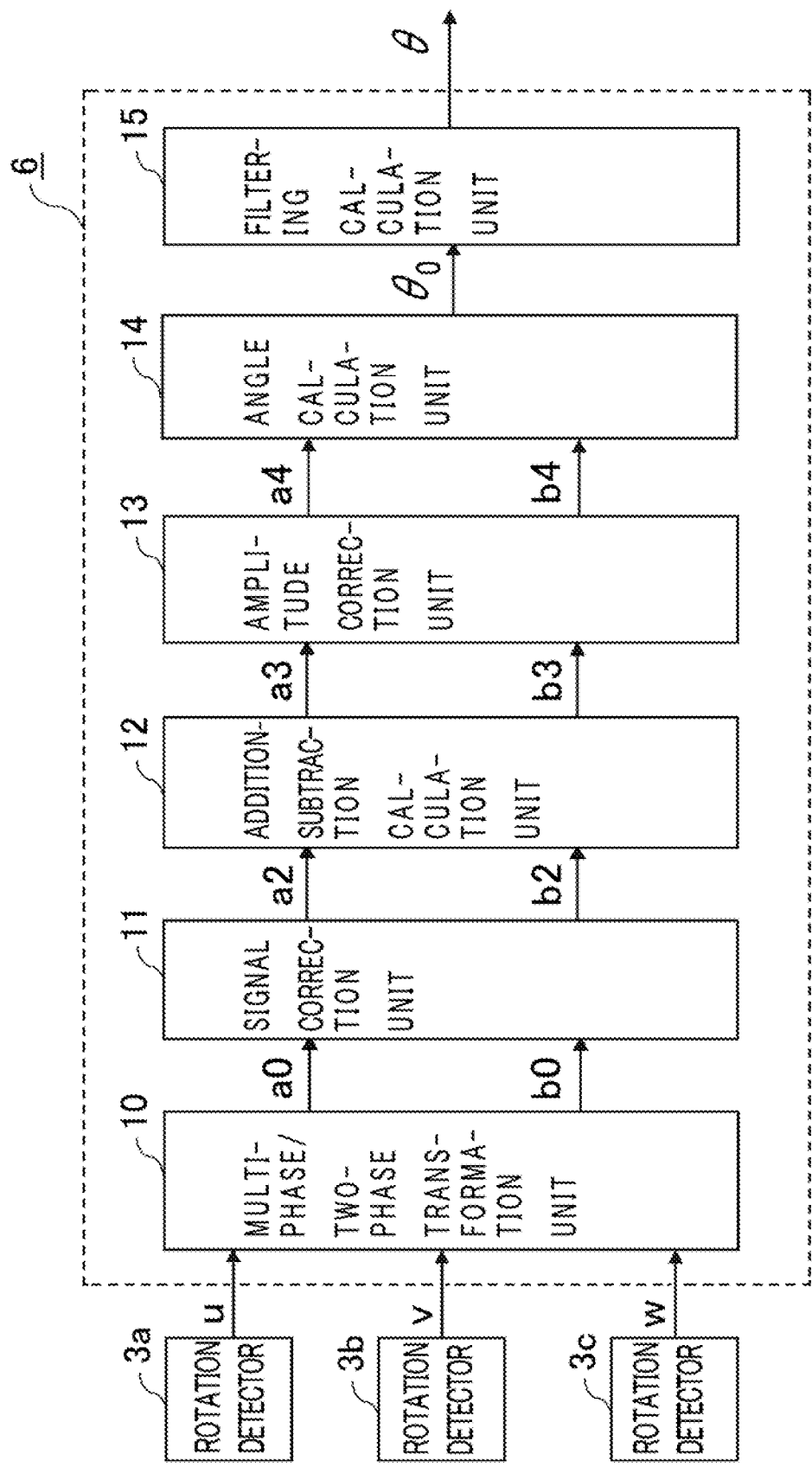
FIG. 3 is a block diagram illustrating an example of a signal processing device in the rotation angle detection device according to Embodiment 1 of the present invention.

FIG. 3 is a schematic block diagram of the signal processing device 6 in the rotation angle detection device 1 according to Embodiment 1. In FIG. 3, the signal processing device 6 has a multi-phase/two-phase transformation unit 10, a signal correction unit 11, an addition-subtraction calculation unit 12, an amplitude correction unit 13, an angle calculation unit 14, and a filtering calculation unit 15.

Hereinafter, the explanation will be made for a case in which the number of rotation detectors 3 is three so that the rotation detectors 3a, 3b and 3c output their signals having a phase difference of 120 degrees from one another with respect to one period of the convex and concave sections 2a, and more specifically, for a case in which actual detection signals u, v and w indicated in Expression (2) are outputted.

[Expression FIG. 2]

$$u = (A+\Delta A_u)\cdot\sin(\theta_r) + d + \Delta d_u + \xi$$

$$v = (A+\Delta A_v)\cdot\sin(\theta_r + \tfrac{2}{3}\pi + \Delta\theta_v) + d + \Delta d_v + \xi$$

$$w = (A+\Delta A_w)\cdot\sin(\theta_r + \tfrac{4}{3}\pi + \Delta\theta_w) + d + \Delta d_w + \xi \tag{2}$$

Here, symbols "$\Delta A_u$," "$\Delta A_v$" and "$\Delta A_w$" designate amplitude errors of detection signals u, v and w, respectively; symbols "$\Delta\theta_v$" and "$\Delta\theta_w$," a deviation of the detection signal v from a phase difference of 120 degrees with respect to the detection signal u, and a deviation of the detection signal w from a phase difference of 240 degrees with respect to the detection signal u, respectively; symbols "$\Delta d_u$," "$\Delta d_v$" and "$\Delta d_w$," deviations of detection signals u, v and w from ideal DC-offset values, respectively; and symbol "$\xi$," electromagnetic noise superimposed on the detection signals u, v and w each. Note that, when the rotation angle detection device 1 in FIG. 1 of Embodiment 1 is mounted on an onboard electric motor, common-mode noise in the same sign is predominant in electromagnetic noise superimposed on the detection signals u, v and w, and the magnitude of the noise is approximately in the same level. For this reason, in Expression (2), electromagnetic noise is defined as "$\xi$," which is superimposed on the detection signals u, v and w each.

<Multi-Phase/Two-Phase Transformation Unit 10>

First, the explanation will be made for the multi-phase/two-phase transformation unit 10. The multi-phase/two-phase transformation unit 10 takes in detection signals u, v and w from the rotation detectors 3a, 3b and 3c as its respective inputs, and, by performing calculation processing in accordance with Expression (3), calculates two-phase signals a0 and b0, which are then outputted into the signal correction unit 11.

[Expression FIG.-3]

$$a0 = u + \cos\left(\frac{2\pi}{3}\right)\cdot v + \cos\left(\frac{4\pi}{3}\right)\cdot w = u - \frac{1}{2}v - \frac{1}{2}w \tag{3}$$

$$b0 = \sin\left(\frac{2\pi}{3}\right)\cdot v + \sin\left(\frac{4\pi}{3}\right)\cdot w = \frac{\sqrt{3}}{2}v - \frac{\sqrt{3}}{2}w$$

Figure 4A:
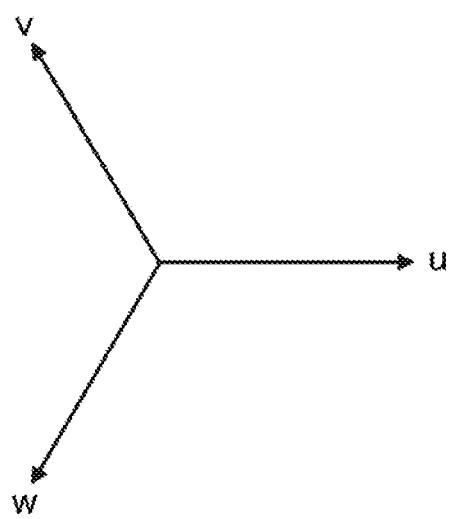
FIGS. 4A and 4B are diagrams showing the relationship between a three-phase coordinate system and an orthogonal coordinate system in a multi-phase/two-phase transformation unit of the rotation angle detection device according to Embodiment 1 of the present invention.
Figure 4B:
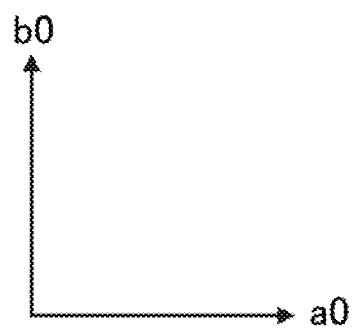

Note that, the calculation processing of Expression (3) means that a three-phase coordinate system u-v-w in which the axes take in equal intervals at 120 degrees therebetween as shown in FIG. 4A is converted into an orthogonal coordinate system a0-b0 of FIG. 4B.

Note also that, in order to perform amplitude modification or correction of two-phase signals a0 and b0 in the signal correction unit 11 as will be described later, those a0 and b0 of Expression (3) may also be defined as arbitrary coefficient's multiples (fixed values) of the right-hand sides thereof, and so, it may be adopted to calculate those as in Expression (4) by using arbitrary coefficients k0 and k1, respectively.

[Expression FIG. 4]

$$a0 = k0\cdot(u - \tfrac{1}{2}v - \tfrac{1}{2}w)$$

$$b0 = k1\cdot(v-w) \tag{4}$$

For example, when it is defined that k0=2, and that k1=1, a simple calculation such as Expression (5) can be achieved, so that it is suitable for a case in which the calculation is carried out on a calculation processing device and/or on an electrical circuit, such as a microcomputer or the like.

Figure 5:
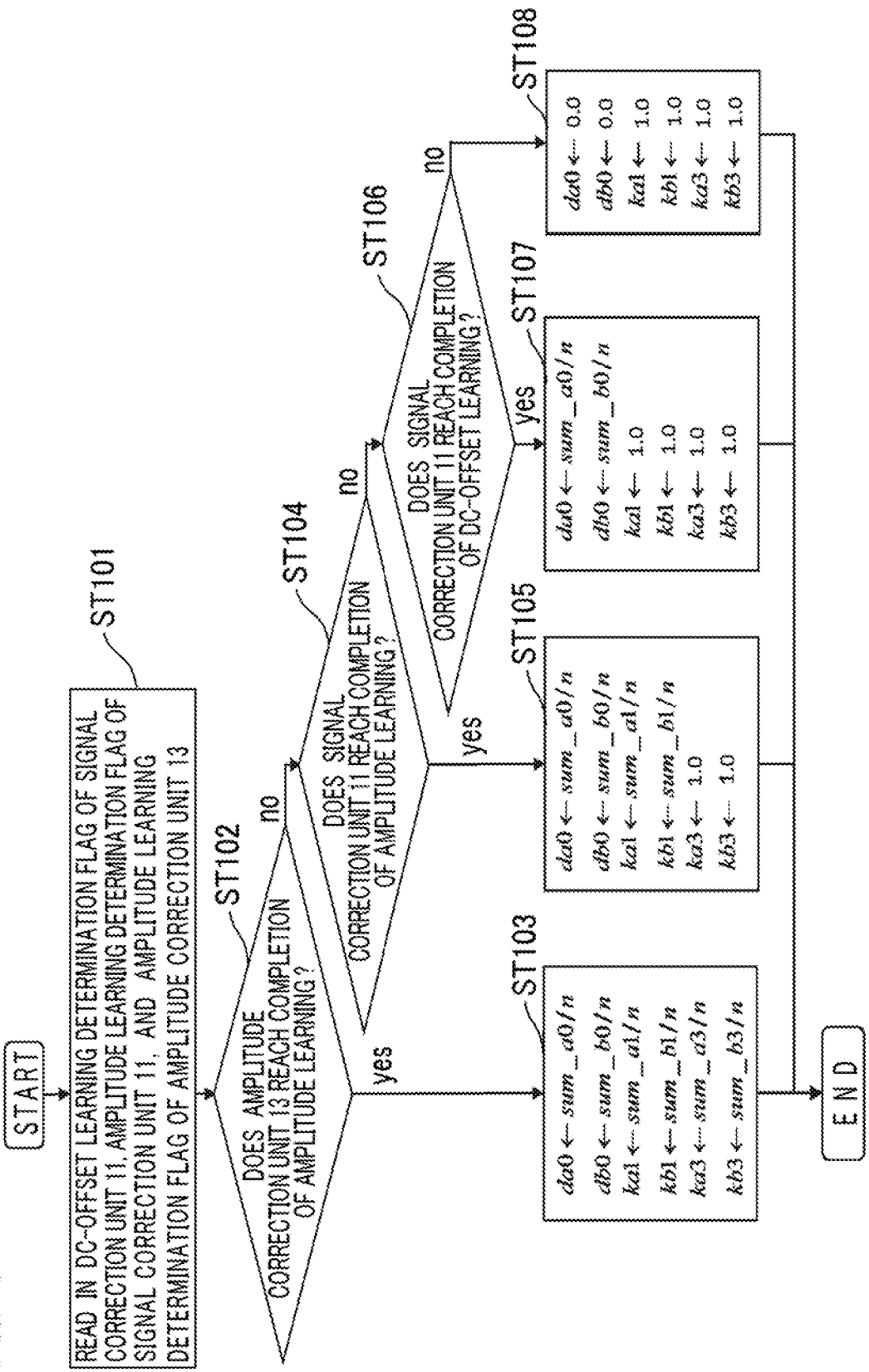
FIG. 5 is a diagram illustrating an example of a flowchart for calculating correction values in a signal correction unit of the rotation angle detection device and an amplitude correction unit thereof according to Embodiment 1 of the present invention.

[Expression FIG. 5]

$$a0 = 2u - v - w$$

$$b0 = v - w \tag{5}$$

Next, in the multi-phase/two-phase transformation unit 10, the explanation will be made for an effect for converting multi-phase signals into two-phase signals. When the detection signals of Expression (2) are substituted into Expression (3), Expression (6) is brought about.

Figure 6:
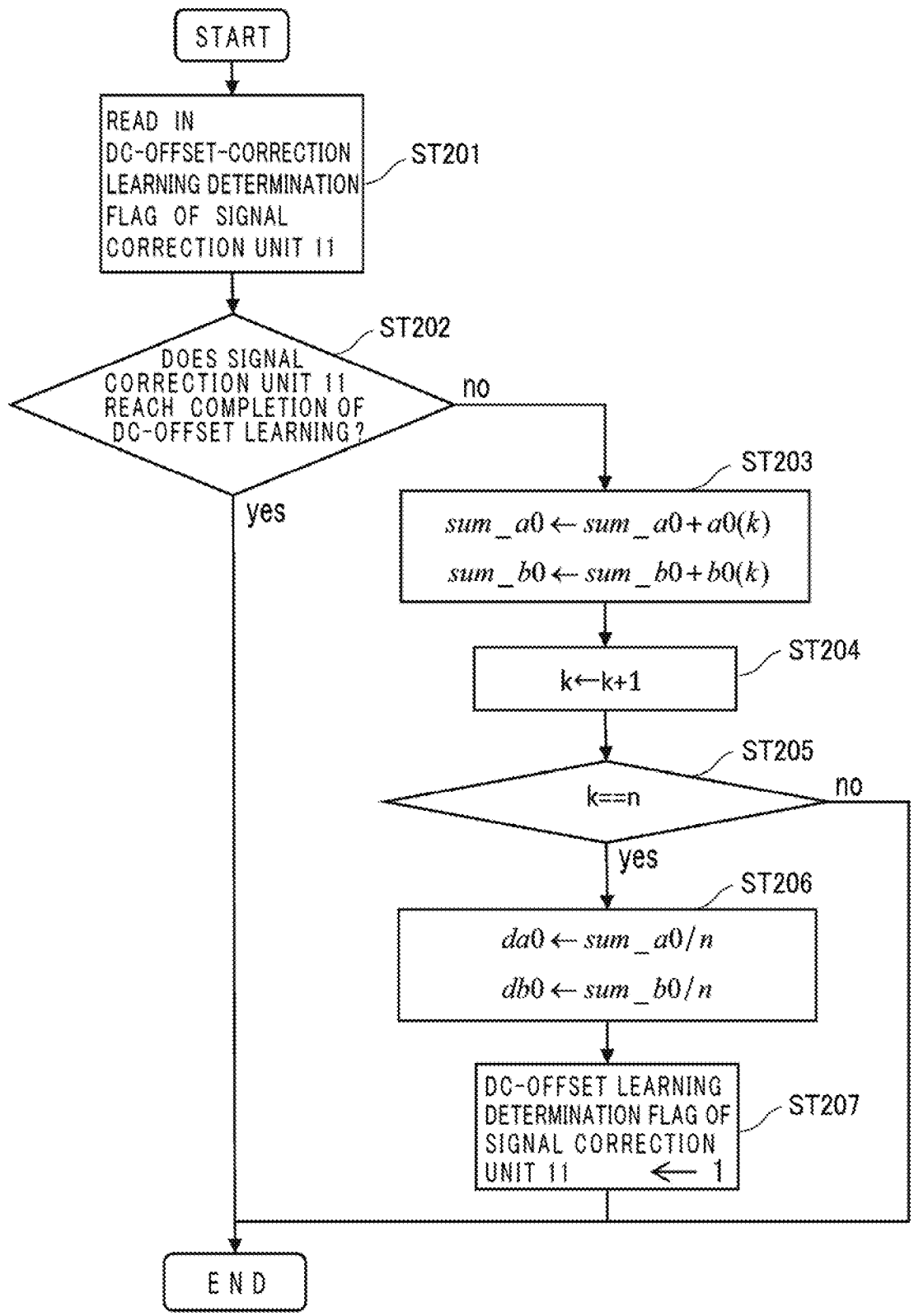
FIG. 6 is a diagram illustrating an example of a flowchart for calculating correction values in the signal correction unit of the rotation angle detection device according to Embodiment 1 of the present invention.

[Expression FIG.-6]

$$a0 = (A+\Delta A_u)\cdot\sin(\theta_c) - \frac{1}{2}\cdot(A+\Delta A_c)\cdot\sin\left(\theta_t + \frac{2}{3}\pi + \Delta\theta_v\right) - \tag{6}$$
$$\frac{1}{2}\cdot(A+\Delta A_x)\cdot\sin\left(\theta_t + \frac{4}{3}\pi + \Delta\theta_w\right) + \Delta d_v - \frac{1}{2}(\Delta d_b + \Delta d_v)$$

$$b0 = \frac{\sqrt{3}}{2}\cdot\left[(A+\Delta A_v)\cdot\sin\left(\theta_r + \frac{2}{3}\pi + \Delta\theta_v\right) - \right.$$
$$\left. (A+\Delta A_w)\cdot\sin\left(\theta_c + \frac{4}{3}\pi + \Delta\theta_w\right) + \frac{1}{2}(\Delta d_v - \Delta d_w)\right]$$

In the multi-phase/two-phase transformation unit 10, it can be understood that, by converting multi-phase signals into two-phase signals using Expression (3) (or Expression (4), or Expression (5)) as in Expression (6), the term of electromagnetic noise "$\xi$" is cancelled out to become zero.

According to this arrangement, even when electromagnetic noise due to an electrical component(s) and the like of an electric automotive vehicle is superimposed on detection signals of the rotation angle detection device, it can be understood that, by converting multi-phase signals into two-phase signals in the multi-phase/two-phase transformation unit 10, it is possible to obtain two-phase signals to which an influence of electromagnetic noise is small to a large extent.

In addition, the number of the rotation detectors is three in Embodiment 1; however, even when the number is more than three, it is similarly possible to reduce electromagnetic noise by converting multi-phase signals into two-phase signals.

<Signal Correction Unit 11>

The signal correction unit 11 takes in two-phase signals a0 and b0 from the multi-phase/two-phase transformation unit 10 as its inputs; and, by performing calculation processing in accordance with Expressions (7) and (8) using a DC-offset correction value da0 of the two-phase signal a0, a DC-offset correction value db0 of the two-phase signal b0, and an amplitude correction coefficient kab0 of the two-phase signals a0 and b0, the signal correction unit outputs post-modification or post-correction two-phase signals a2 and b2.

Figure 7:
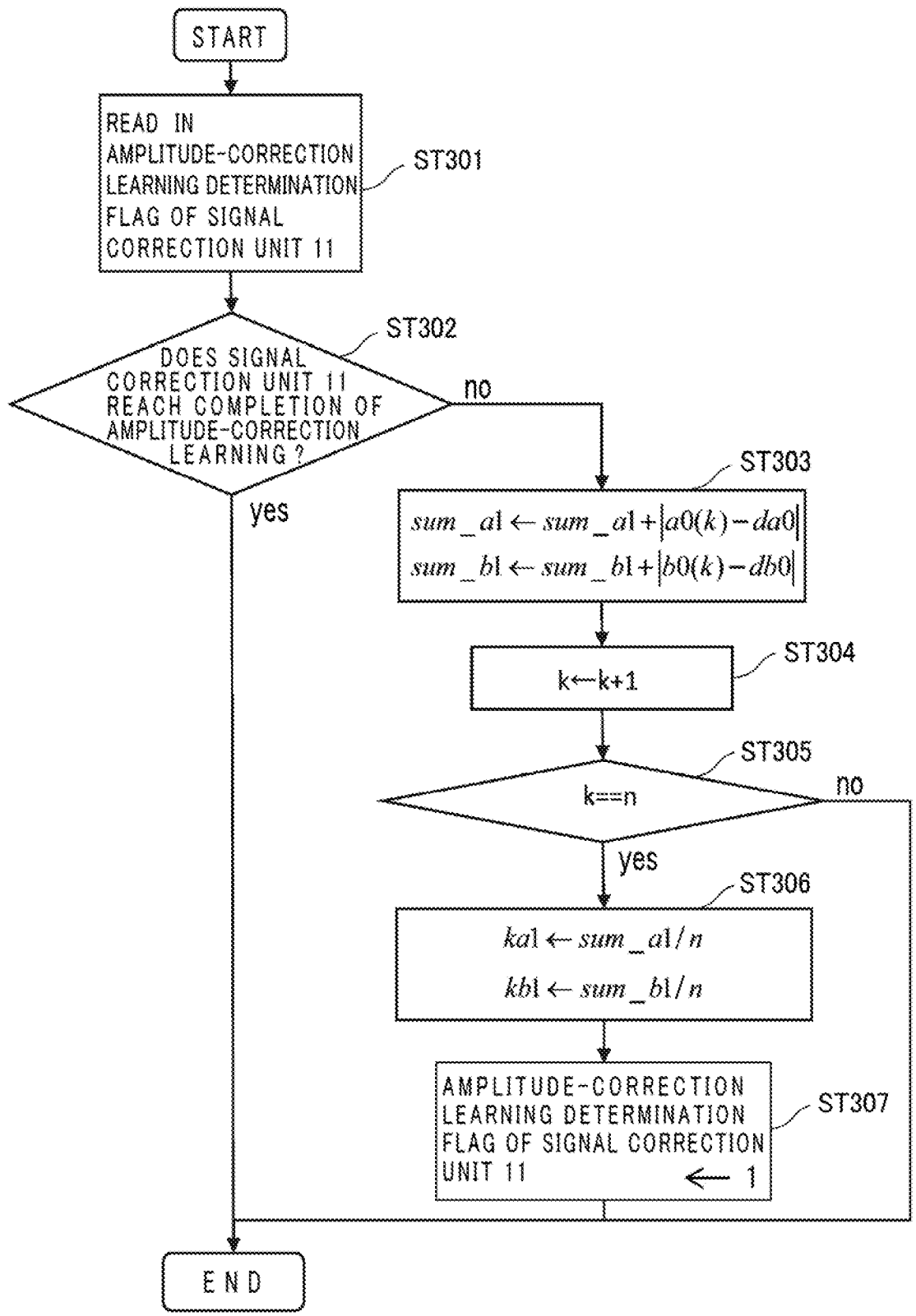
FIG. 7 is a diagram illustrating an example of a flowchart for calculating correction values in the signal correction unit of the rotation angle detection device according to Embodiment 1 of the present invention.

[Expression FIG. 7]

$$a1 = a0 - da0$$

$$b1 = b0 - db0 \quad (7)$$

Figure 8:
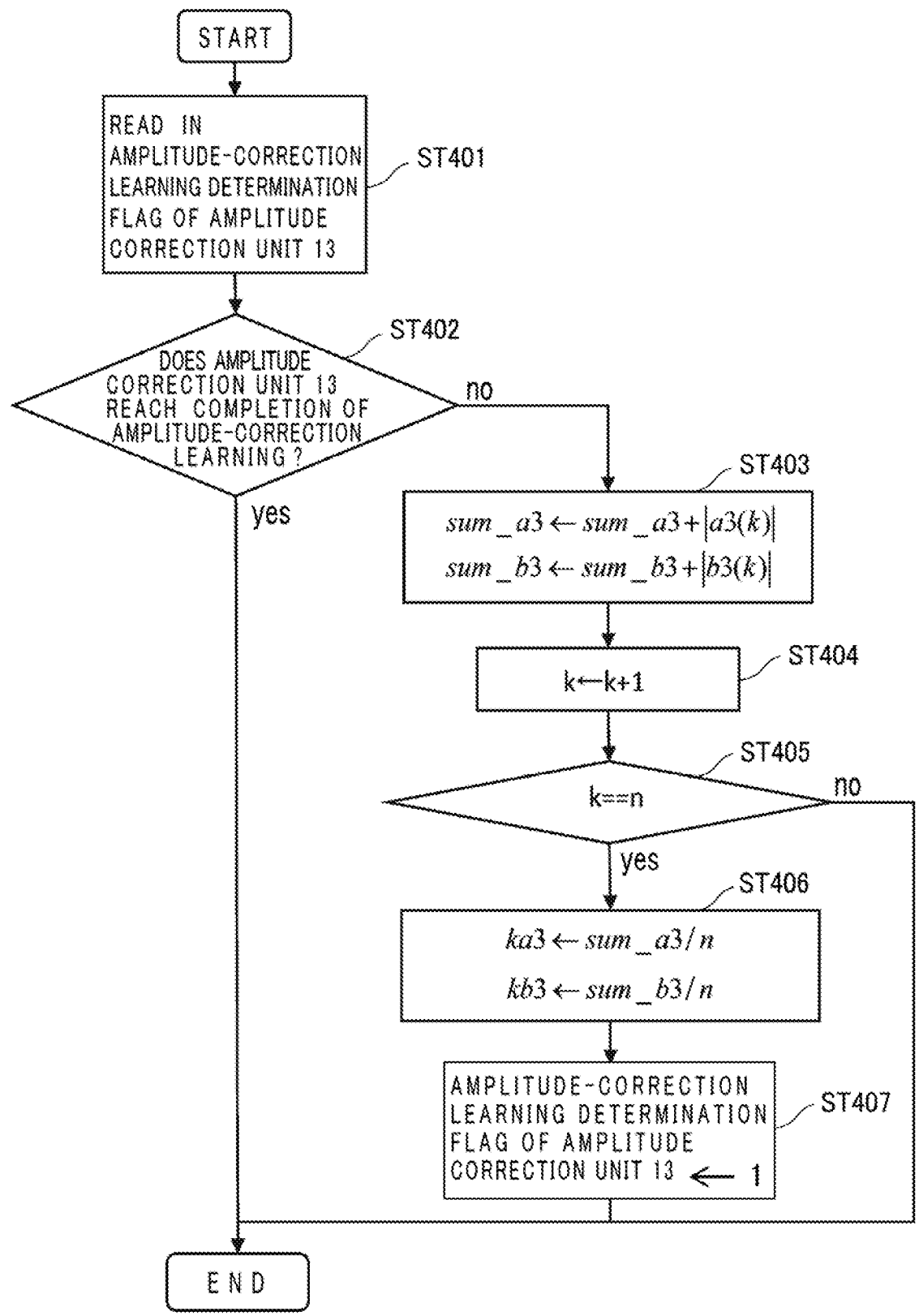
FIG. 8 is a diagram illustrating an example of a flowchart for calculating correction values in the amplitude correction unit of the rotation angle detection device according to Embodiment 1 of the present invention.

[Expression FIG. 8]

$$a2 = a1$$

$$b2 = kab1 \cdot b1 \quad (8)$$

Here, Expression (7) is the calculation for modifying DC-offset values of two-phase signals a0 and b0; and Expression (8), the calculation for modifying amplitudes to be neatly adjusted between a2 and b2 with respect to the amplitudes after the DC-offset values have been modified.

In Expression (7), a DC-offset correction value da0 of the two-phase signal a0, and a DC-offset correction value db0 of the two-phase signal b0 are the values arranged to be calculated in accordance with Expression (9), for example.

Figure 9:
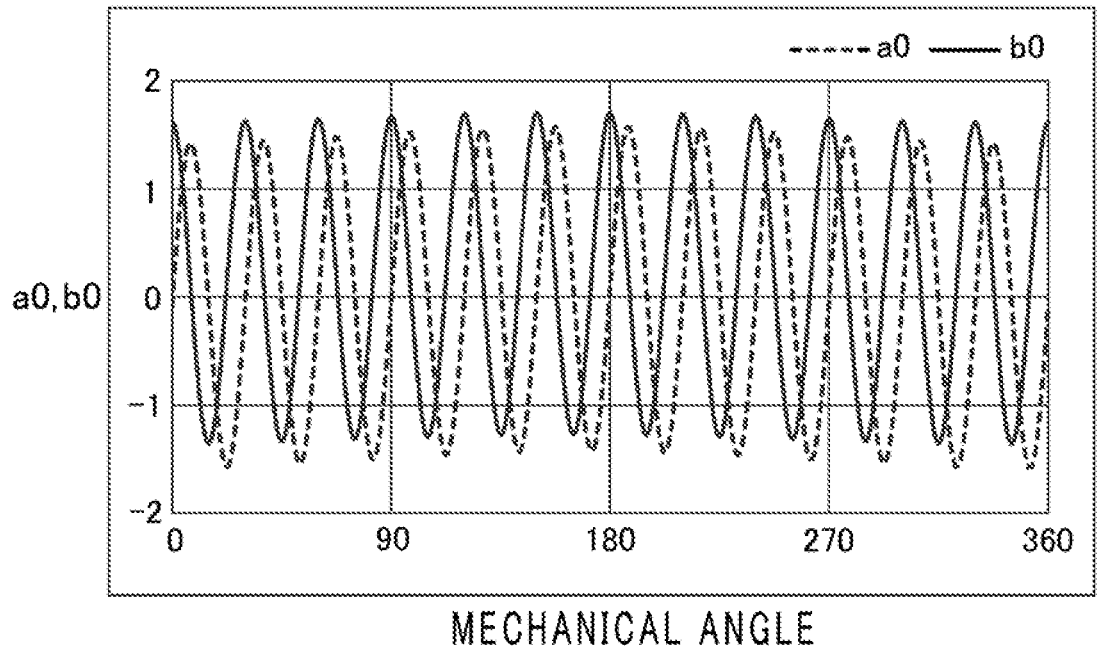
FIG. 9 is a diagram illustrating an example of waveforms of two-phase signals in the multi-phase/two-phase transformation unit of the rotation angle detection device according to Embodiment 1 of the present invention.

[Expression FIG.-9]

$$da0 = \left[ \sum_{k=0}^{n-1} a0(k \cdot \Delta t) \right] / n \quad (9)$$

$$db0 = \left[ \sum_{k=0}^{n-1} b0(k \cdot \Delta t) \right] / n$$

Here, symbol "k" designates k-th data; symbol "Δt," a sampling period (an arbitrary fixed period in the embodiment); "k·Δt," a time from a start of data acquisition; and symbol "n," a total number of data used for the calculation. It should be noted that, an "arbitrary fixed period" stands for a constant period (a period of sampling is constant) in which those signals are acquired, and the period is a period which can be appropriately set in advance.

In Expression (8), an amplitude correction coefficient kab1 of two-phase signals a0 and b0 is a coefficient arranged to be calculated in accordance with an amplitude correction coefficient ka1 of the two-phase signal a0 of Expression (10), and with an amplitude correction coefficient kb1 of the two-phase signal b0 thereof, for example.

Figure 10:
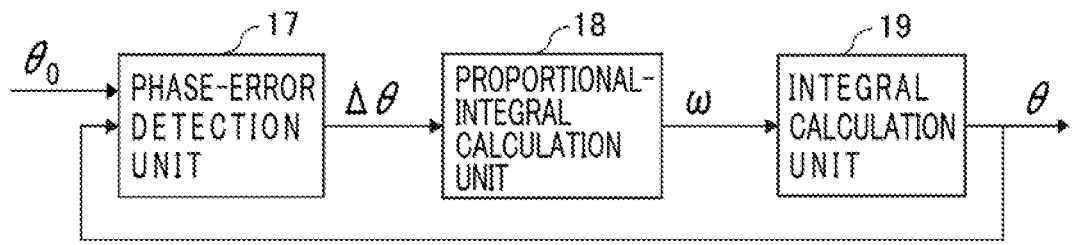
FIG. 10 is a block diagram illustrating an example of a filtering calculation unit of the rotation angle detection device according to Embodiment 1 of the present invention.

[Expression FIG.-10]

$$ka1 = \left[ \sum_{k=n}^{2n-1} |a0(k \cdot \Delta t) - da0| \right] / n = \left[ \sum_{k=n}^{2n-1} |a1(k \cdot \Delta t)| \right] / n \quad (10)$$

$$kb1 = \left[ \sum_{k=n}^{2n-1} |b0(k \cdot \Delta t) - db0| \right] / n = \left[ \sum_{k=n}^{2n-1} |b1(k \cdot \Delta t)| \right] / n$$

$$kab1 = ka1/kb1$$

Note that, in Expression (10), the amplitude correction coefficients ka1 and kb1 are acquired as arithmetic averages or means of absolute values using the two-phase signals a0 and b0, respectively; however, the coefficients may be acquired as root-mean-square values using the two-phase signals a0 and b0.

In FIG. 9, an example of waveforms of two-phase signals a0 and b0 is illustrated for the quantity of one revolution at a mechanical angle when the rotating body 9 is rotated at a constant number of revolutions. As for the two-phase signals a0 and b0, a waviness component of one period per one revolution at a mechanical angle is superimposed on signals of twelve periods per one revolution at a mechanical angle, namely, on those of which one period corresponds to 360 degrees of the convex and concave sections 2a each of the rotor 2. For this reason, as a total number of data "n" of the two-phase signals a0 and b0, the total number of data "n" is determined in such a manner that, by defining one period of the convex and concave sections 2a each of the rotor 2 as 360 degrees, a data range takes on the quantity of one period or more, and also takes on a period(s) in close vicinity to an integral multiple of 360 degrees as much as possible, whereby an average value can be achieved by using data of the quantity of one period in varying periods, and so, for example, it is made possible to calculate DC-offset correction values da0 and db0, and an amplitude correction coefficient kab0 in which their variations are small, even under the condition that the number of revolutions is different.

According to the manner described above, it is possible to curb the increase of angular errors due to variations in convex and concave shapes each of the convex and concave sections 2a of the rotor 2, and/or due to variations of DC-offset correction values da0 and db0, and those of an amplitude correction coefficient ka0 in which their variations are caused by a change(s) in relative positions between the rotor 2 and the rotation detectors 3a, 3b and 3c, so that it is possible to obtain an angular signal θ whose angle detection value is stable.

Next, the explanation will be made in more detail using Expression (6) through Expression (11) for the operations of the signal correction unit 11.

When Expression (6) is applied to Expression (9), DC-offset correction values da0 and db0 are acquired as in Expression (11), because an average value to periods of an integral multiple of the terms in which symbols "sin" are included becomes zero.

Figure 11:
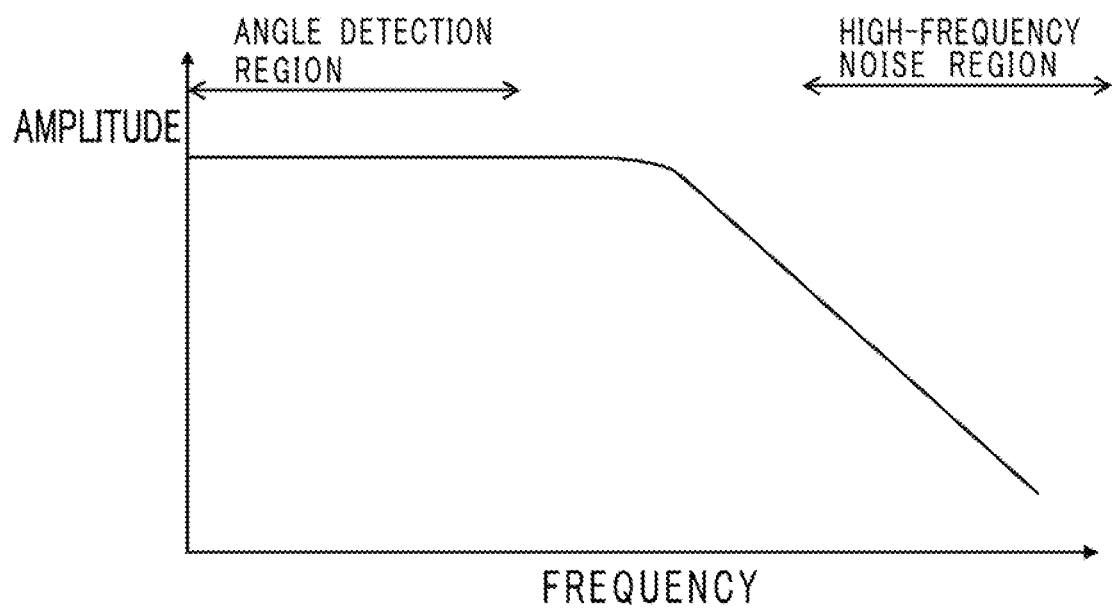
FIG. 11 is a diagram illustrating an example of frequency characteristics in the filtering calculation unit of the rotation angle detection device according to Embodiment 1 of the present invention.

[Expression FIG.-11]

$$da0 = \Delta d_u - \frac{1}{2}(\Delta d_v + \Delta d_w) \quad (11)$$

$$db0 = \frac{\sqrt{3}}{2} \cdot \left[ \frac{1}{2}(\Delta d_v - \Delta d_w) \right]$$

From Expression (6), Expression (7) and Expression (11), "a1" and "b1" are derived as in Expression (12).

Figure 12:
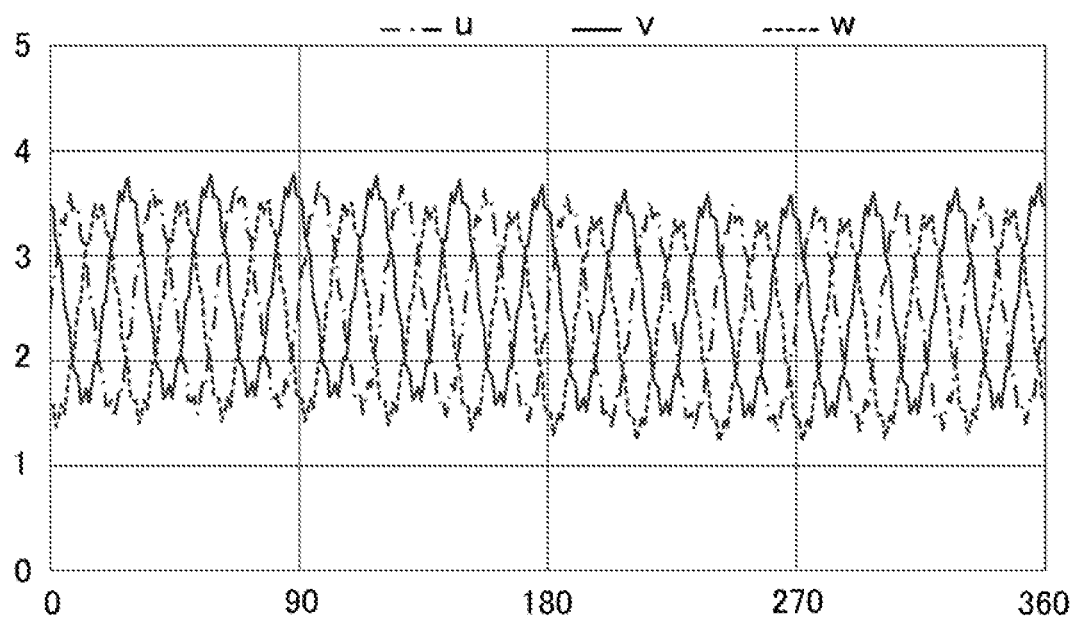
FIG. 12 is a diagram illustrating signal waveforms of detection signals including high-frequency noise in the rotation angle detection device according to Embodiment 1 of the present invention.

[Expression FIG.-12]

$$a1 = a0 - da0 \tag{12}$$
$$= (A + \Delta A_u) \cdot \sin(\theta_r) - \frac{1}{2} \cdot$$
$$(A + \Delta A_v) \cdot \sin\left(\theta_r + \frac{2}{3}\pi + \Delta\theta_v\right) -$$
$$\frac{1}{2} \cdot (A + \Delta A_w) \cdot \sin\left(\theta_r + \frac{4}{3}\pi + \Delta\theta_w\right)$$

$$b1 = b0 - db0$$
$$= \frac{\sqrt{3}}{2} \cdot \left[ (A + \Delta A_v) \cdot \sin\left(\theta_r + \frac{2}{3}\pi + \Delta\theta_v\right) - (A + \Delta A_w) \cdot \sin\left(\theta_r + \frac{4}{3}\pi + \Delta\theta_w\right) \right]$$

Expression (12) indicates addition-subtraction calculations of sinusoidal waves each of which changes in the same period. As it is well known that a result of addition-subtraction calculations of sinusoidal waves each changing in the same period gives one sinusoidal wave changing in the same period, and so, Expression (12) can be expressed as Expression (13).

Figure 13:
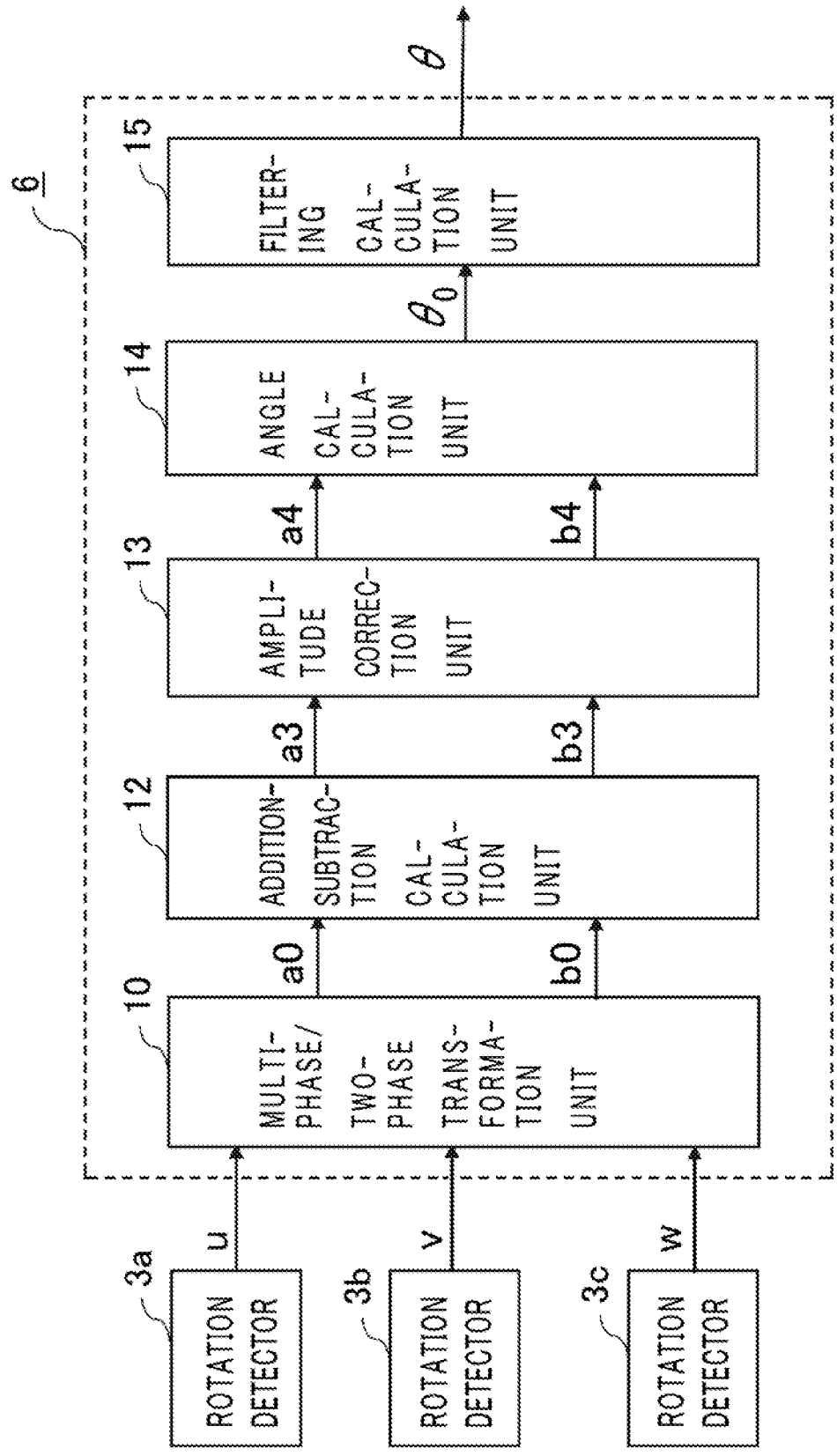
FIG. 13 is a block diagram illustrating an example of a signal processing device in a rotation angle detection device according to Embodiment 2 of the present invention.

[Expression FIG. 13]

$$a1 = A_{a1} \cdot \sin(\theta_r + \Delta\theta_{a1})$$
$$b1 = A_{b1} \cdot \cos(\theta_r + \Delta\theta_{b1}) \tag{13}$$

Here, symbols "$A_{a1}$" and "$A_{b1}$" designate amplitudes of "a1" and "b1," respectively; and symbols "$\Delta\theta_{a1}$" and "$\Delta\theta_{b1}$," phase differences from a detection signal u.

Next, from Expression (13) and Expression (10), an amplitude correction value kab is derived as in Expression (14).

Figure 14:
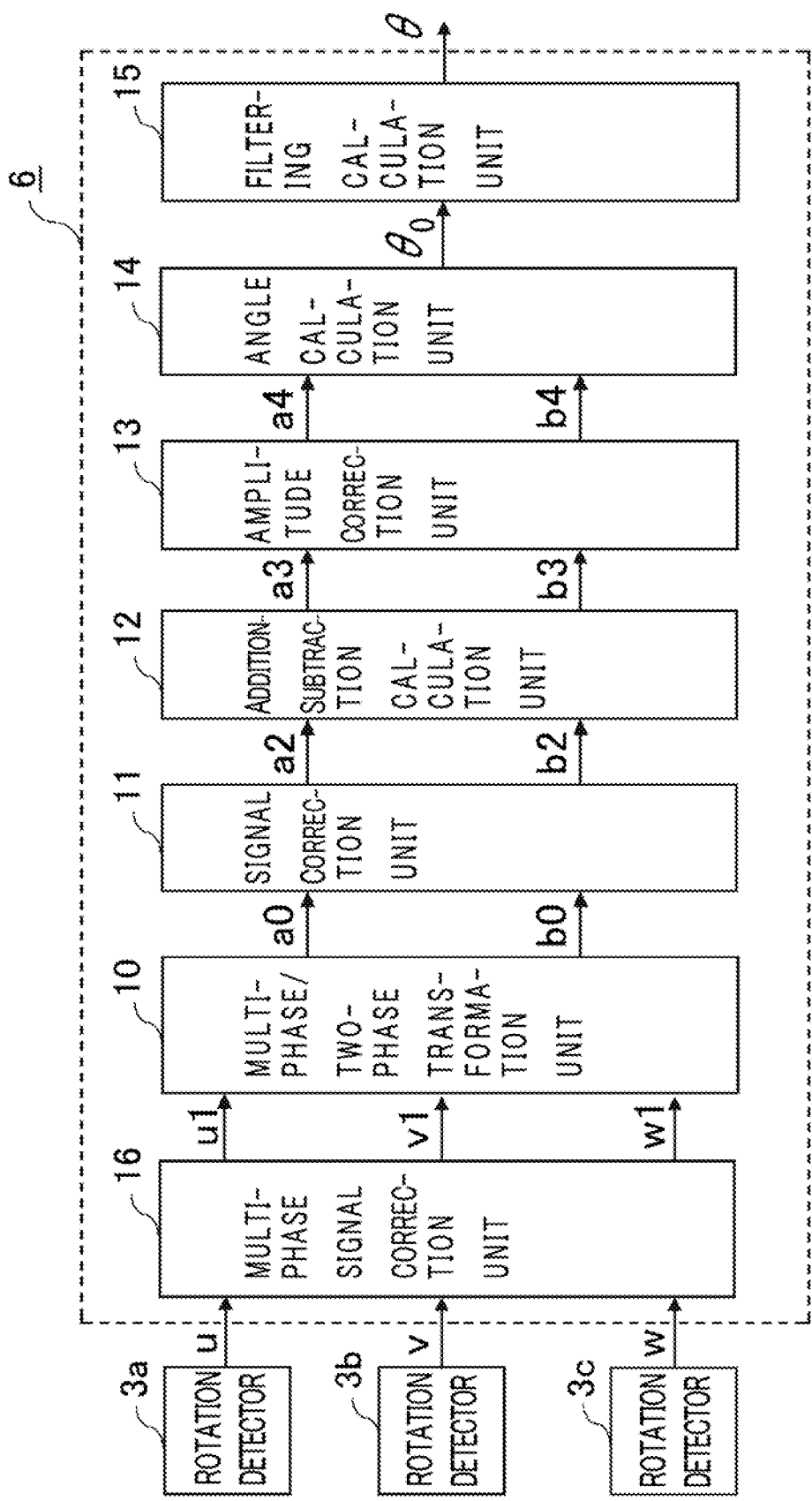
FIG. 14 is a block diagram illustrating an example of a signal processing device in a rotation angle detection device according to Embodiment 3 of the present invention.

[Expression FIG.-14]

$$ka1 = \frac{2}{\pi} \cdot A_{a1} \tag{14}$$
$$kb1 = \frac{2}{\pi} \cdot A_{b1}$$
$$kab1 = ka1/kb1 = \frac{A_{a1}}{A_{b1}}$$

From Expression (8), Expression (13) and Expression (14), post-correction two-phase signals a2 and b2 are derived as in Expression (15). It can be understood that the post-correction two-phase signals a2 and b2 become two signals whose amplitudes are the same, and whose phases are different from each other.

Figure 15:
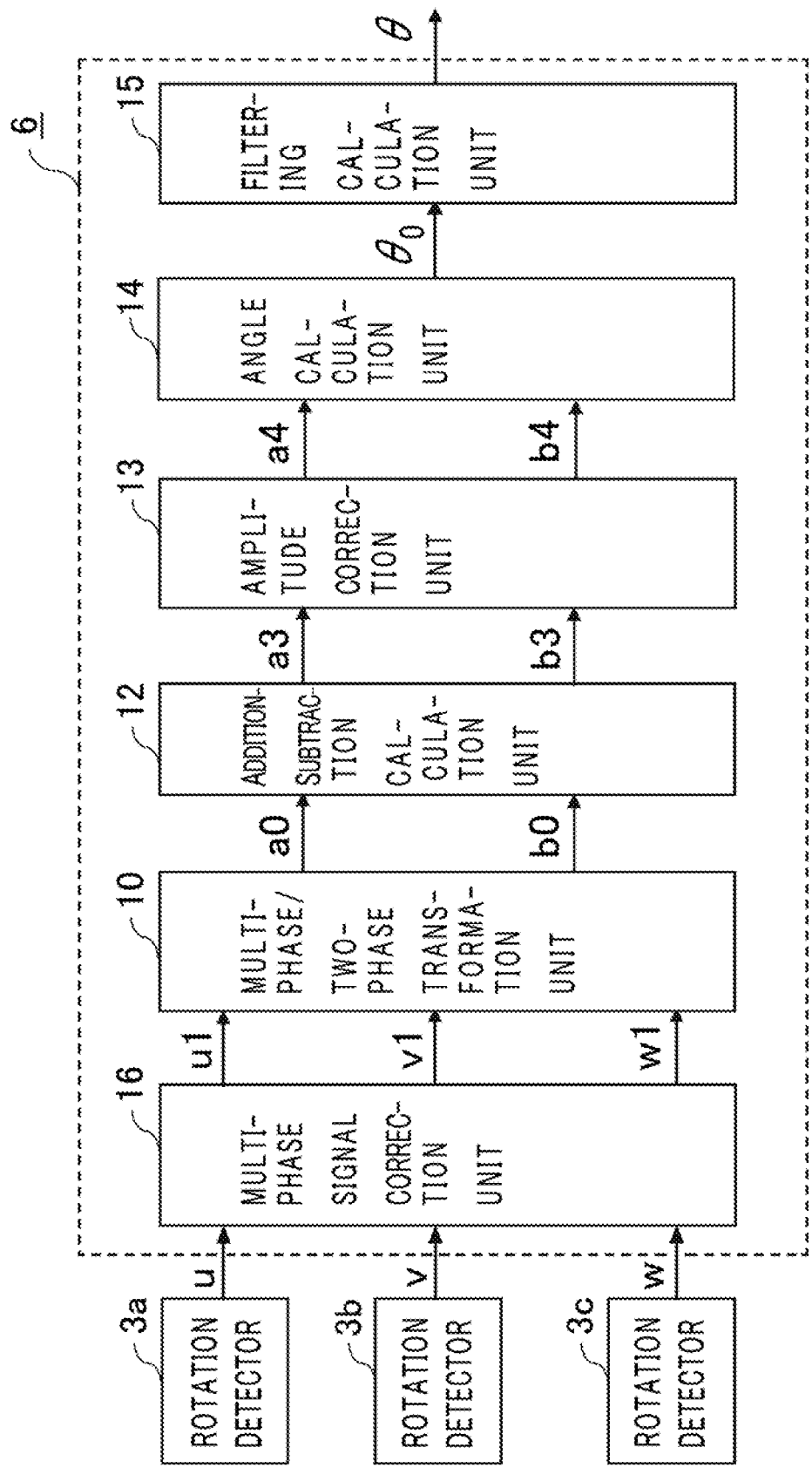
FIG. 15 is a block diagram illustrating an example of a signal processing device in a rotation angle detection device according to Embodiment 4 of the present invention.

[Expression FIG. 15]

$$a2 = A_{a1} \cdot \sin(\theta_r + \Delta\theta_{a1})$$
$$b2 = A_{a1} \cdot \cos(\theta_r + \Delta\theta_{b1}) \tag{15}$$

<Addition-Subtraction Unit 12>

The addition-subtraction calculation unit 12 takes in post-correction two-phase signals a2 and b2 from the signal correction unit 11 as its inputs, and outputs addition-subtraction signals a3 and b3 in accordance with Expression (16).

Figure 16:
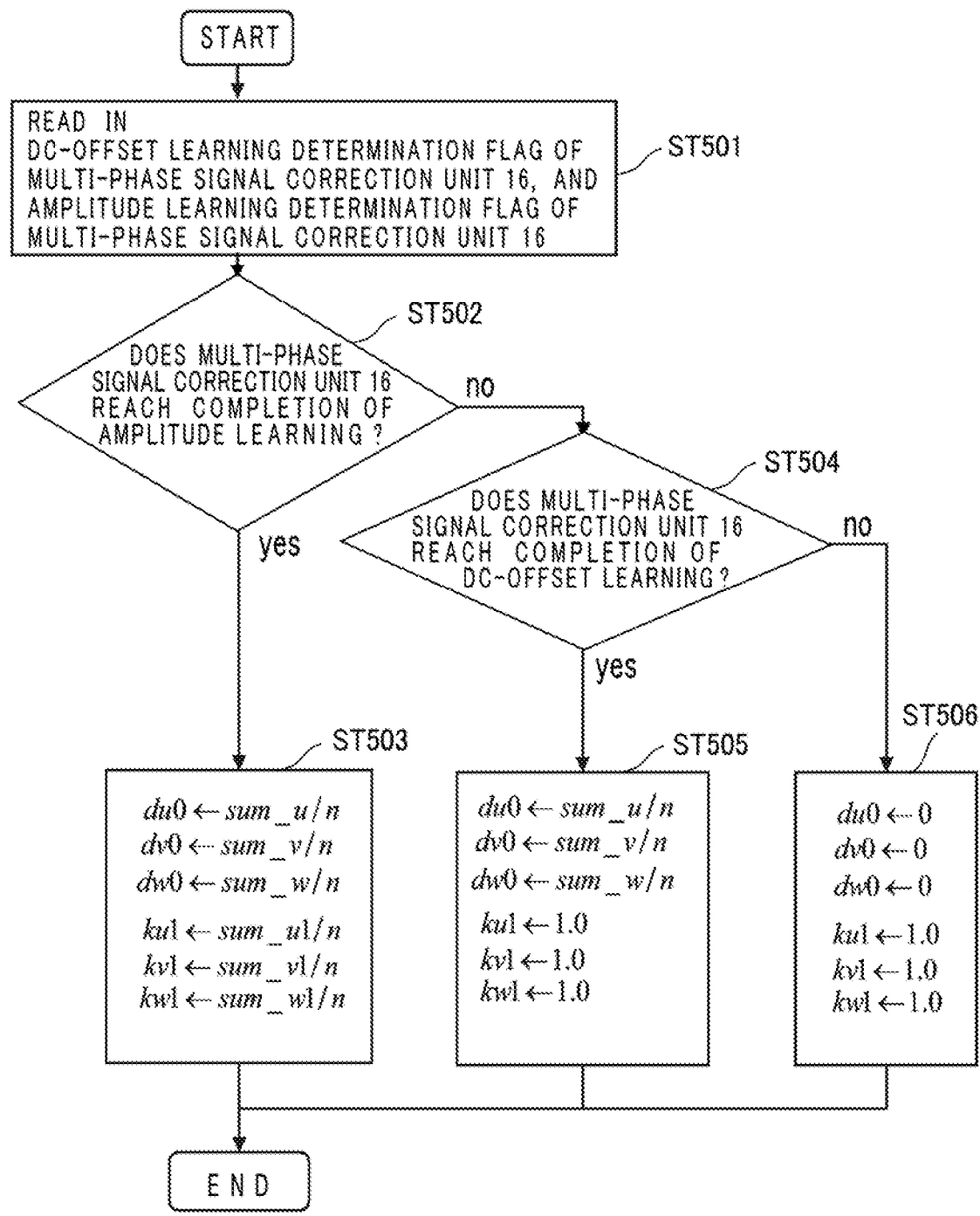
FIG. 16 is a diagram illustrating an example of a flowchart for calculating correction values of a signal correction unit in the rotation angle detection devices each according to Embodiments 3 and 4 of the present invention.

[Expression FIG. 16]

$$a3 = a2 + b2$$
$$b3 = a2 - b2 \tag{16}$$

Next, the explanation will be made for the operations of the addition-subtraction calculation unit 12 using Expression (15) and Expression (16). From Expression (15) and Expression (16), addition-subtraction signals a3 and b3 are brought as in Expression (17).

Figure 17:
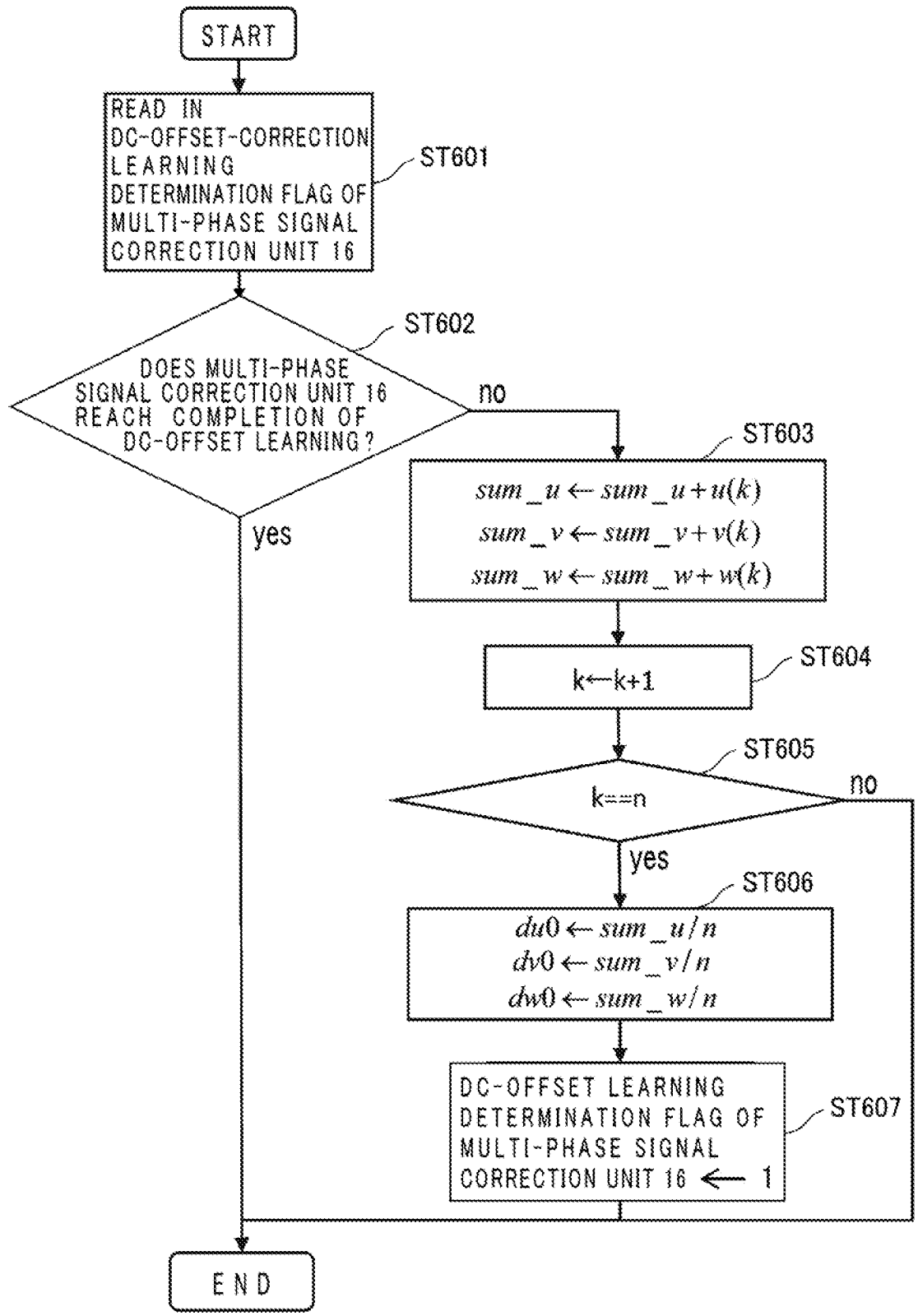
FIG. 17 is a diagram illustrating an example of a flowchart for calculating correction values of the signal correction unit in the rotation angle detection devices each according to Embodiments 3 and 4 of the present invention.

[Expression FIG.-17]

$$a3 = A_{a1} \cdot \sin(\theta_r + \Delta\theta_{a1}) + A_{a1} \cdot \sin\left(\theta_r + \frac{\pi}{2} + \Delta\theta_{a1} + \delta\right) \tag{17}$$
$$= \left[2 \cdot A_{a1} \cdot \cos\left(\frac{\pi}{4} + \frac{\delta}{2}\right)\right] \cdot \sin\left(\theta_r + \frac{\pi}{4} + \Delta\theta_{a1} + \frac{\delta}{2}\right)$$
$$= A_{a3} \cdot \sin\left(\theta_r + \frac{\pi}{4} + \Delta\theta_{a1} + \frac{\delta}{2}\right)$$

$$b3 = A_{a1} \cdot \sin(\theta_r + \Delta\theta_{a1}) - A_{a1} \cdot \sin\left(\theta_r + \frac{\pi}{2} + \Delta\theta_{a1} + \delta\right)$$
$$= \left[2 \cdot A_{a1} \cdot \sin\left(\frac{\pi}{4} + \frac{\delta}{2}\right)\right] \cdot \cos\left(\theta_r + \frac{\pi}{4} + \Delta\theta_{a1} + \frac{\delta}{2}\right)$$
$$= A_{b3} \cdot \cos\left(\theta_r + \frac{\pi}{4} + \Delta\theta_{a1} + \frac{\delta}{2}\right)$$

$$A_{a3} = 2 \cdot A_{a1} \cdot \cos\left(\frac{\pi}{4} + \frac{\delta}{2}\right)$$
$$A_{b3} = 2 \cdot A_{a1} \cdot \sin\left(\frac{\pi}{4} + \frac{\delta}{2}\right)$$
$$\delta = \Delta\theta_{b1} - \Delta\theta_{a1}$$

Here, symbols "$A_{a3}$" and "$A_{b3}$" designate the amplitudes of the addition-subtraction signals a3 and b3, respectively.

From Expression (17), it can be understood that the addition-subtraction signals a3 and b3 become signals whose directions are orthogonal to each other, and whose amplitudes are different from each other.

<Amplitude Correction Unit 13>

The amplitude correction unit 13 takes in addition-subtraction signals a3 and b3 from the addition-subtraction calculation unit 12 as its inputs, and, by using an amplitude correction coefficient kab34 in accordance with Expression (18), calculates post-modification or post-correction addition-subtraction signals a4 and b4, which are then outputted.

Figure 18:
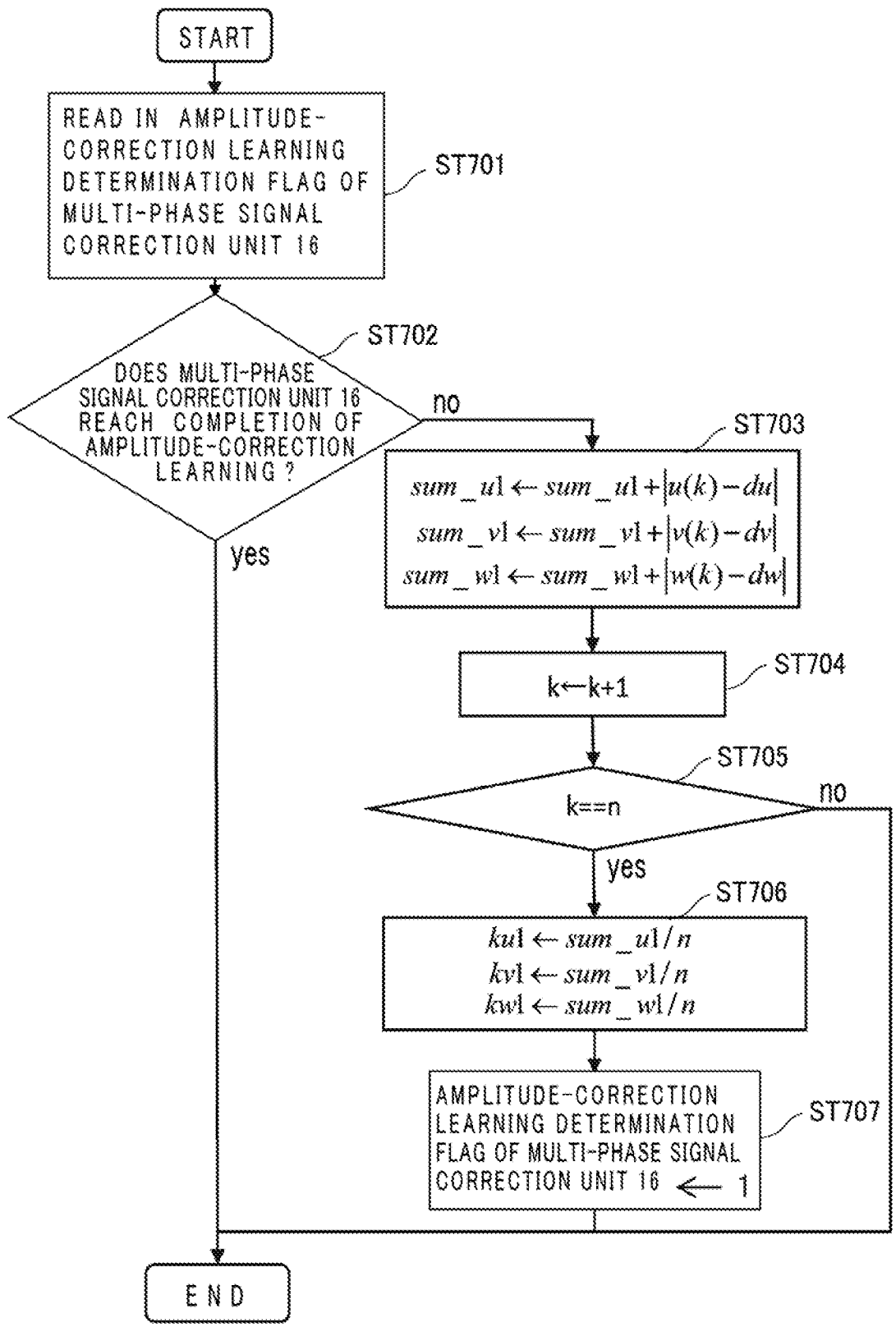
FIG. 18 is a diagram illustrating an example of a flowchart for calculating correction values of the signal correction unit in the rotation angle detection devices each according to Embodiments 3 and 4 of the present invention.

[Expression FIG. 18]

$$a4 = a3$$
$$b4 = kab34 \cdot b3 \tag{18}$$

In Expression (18), the amplitude correction coefficient kab34 is a coefficient which is calculated in accordance with Expression (19), for example.

Figure 19:
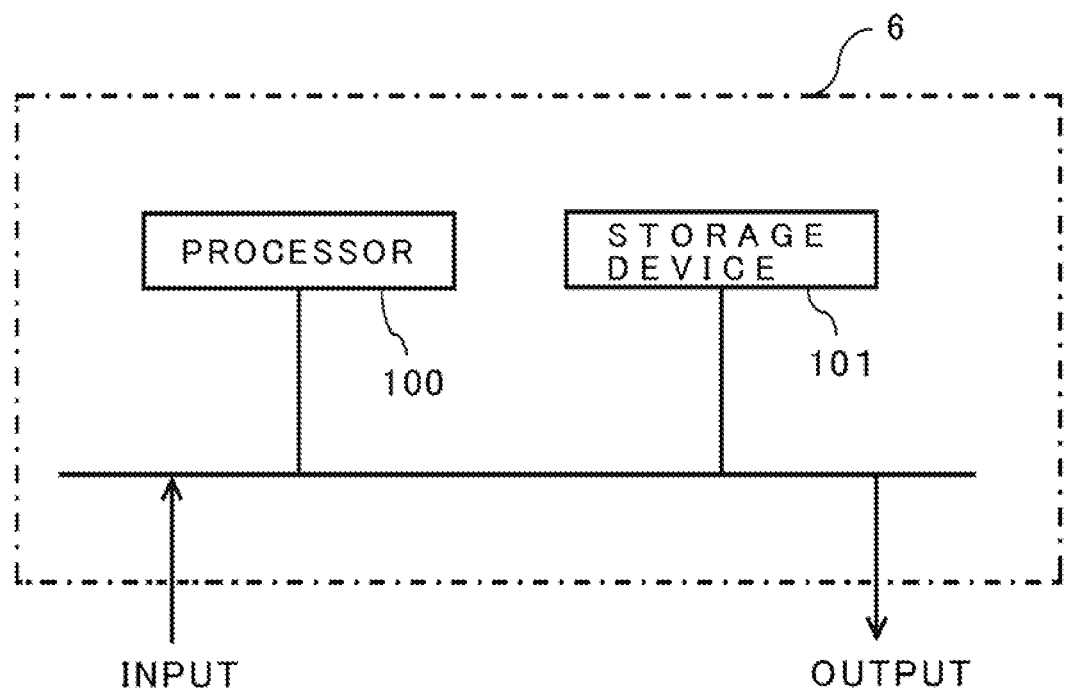
FIG. 19 is a diagram showing an example of a hardware configuration for the signal processing device in the embodiments each of the present invention.

[Expression FIG.-19]

$$ka3 = \left[\sum_{k=n}^{2n-1} |a3(k \cdot \Delta t)|\right]/n \quad (19)$$

$$kb3 = \left[\sum_{k=n}^{2n-1} |b3(k \cdot \Delta t)|\right]/n$$

$$kab34 = ka3/kb3$$

Here, symbol "k" designates k-th data; symbol "$\Delta t$," a sampling period (an arbitrary fixed period in the embodiment); "$k \cdot \Delta t$," a time from a start of data acquisition; and symbol "n," a total number of data used for the calculation of amplitude correction coefficients ka3 and kb3.

Note that, in Expression (19), the amplitude correction coefficients ka3 and kb3 are acquired as arithmetic averages or means of absolute values using the addition-subtraction signals a3 and b3, respectively; however, the coefficients may be acquired as root-mean-square values using the addition-subtraction signals a3 and b3.

It should be noted that, as for the two-phase signals a0 and b0 which derive those addition-subtraction signals a3 and b3, a waviness component of one period per one revolution at a mechanical angle is superimposed on waviness components corresponding to twelve periods per one revolution at a mechanical angle, namely, on those of which one period corresponds to 360 degrees of the convex and concave sections 2a each of the rotor 2 as described above; and thus, it is suitable that, as a total number of data "n" for calculating the amplitude correction values ka3 and kb3, the total number of data "n" is determined in such a manner that, by defining one period of the convex and concave sections 2a each of the rotor 2 as 360 degrees, a data range takes on the quantity of one period or more, and also takes on a period(s) in close vicinity to an integral multiple of 360 degrees as much as possible.

Next, the explanation will be made for detailed operations of the amplitude correction unit 13 using Expression (17), Expression (18) and Expression (19). From Expression (17), Expression (18) and Expression (19), an amplitude correction coefficient kab34 is derived as in Expression (20).

[Expression FIG.-20]

$$ka3 = \frac{4}{\pi} \cdot A_{a1} \cdot \cos\left(\frac{\pi}{4} + \frac{\delta}{2}\right) \quad (20)$$

$$kb3 = \frac{4}{\pi} \cdot A_{a1} \cdot \sin\left(\frac{\pi}{4} + \frac{\delta}{2}\right)$$

$$kab34 = \frac{\cos\left(\frac{\pi}{4} + \frac{\delta}{2}\right)}{\sin\left(\frac{\pi}{4} + \frac{\delta}{2}\right)}$$

From Expression (17), Expression (18) and Expression (20), Expression (21) can be obtained.

[Expression FIG.-21]

$$a4 = \left[2 \cdot A_{a1} \cdot \cos\left(\frac{\pi}{4} + \frac{\delta}{2}\right)\right] \cdot \sin\left(\theta_r + \frac{\pi}{4} + \Delta\theta_{a1} + \frac{\delta}{2}\right) = \quad (21)$$

$$A_{a3} \cdot \sin\left(\theta_r + \frac{\pi}{4} + \Delta\theta_{a1} + \frac{\delta}{2}\right)$$

$$b4 = \left[2 \cdot A_{a1} \cdot \cos\left(\frac{\pi}{4} + \frac{\delta}{2}\right)\right] \cdot \cos\left(\theta_r + \frac{\pi}{4} + \Delta\theta_{a1} + \frac{\delta}{2}\right) =$$

$$A_{a3} \cdot \cos\left(\theta_r + \frac{\pi}{4} + \Delta\theta_{a1} + \frac{\delta}{2}\right)$$

As indicated in Expression (21), it can be understood that the post-correction addition-subtraction signals a4 and b4 become two-phase signals whose amplitudes are the same, and whose directions are orthogonal to each other.

<Angle Calculation Unit 14>

The angle calculation unit 14 takes in post-correction addition-subtraction signals a4 and b4 from the amplitude correction unit 13 as its inputs, and, in accordance with Expression (22), calculates an angular signal $\theta_0$, which is then outputted.

[Expression FIG. 22]

$$\theta_0 = a \tan 2(a4, b4) \quad (22)$$

Next, the explanation will be made for the operations of the angle calculation unit 14 using Expression (21) and Expression (22). From Expression (21) and Expression (22), an angular signal $\theta_0$ can be obtained as in Expression (23), and so, it can be understood that the angular signal $\theta_0$ changes while having an approximately constant offset with an angle $\theta_r$ of the rotating body 9.

[Expression FIG.-23]

$$\theta_0 = \theta_r + \frac{\pi}{4} + \Delta\theta_{a1} + \frac{\delta}{2} \quad (23)$$

Note that, as indicated in Expression (23), the angular signal $\theta_0$ has an approximately constant DC-offset value (from the second term onward on the right-hand side in Expression (23)). In the control of an electric motor, an offset value(s) being set in advance on software is modified and used in general, and so, it can be understood as in Expression (24) that, by performing software modification or correction on the DC-offset value, an angular signal $\theta'_0$ is coincident with the angle $\theta_r$ of the rotating body 9. Here, symbol "$\theta'_0$" designates a post-correction angular signal.

[Expression FIG.-24]

$$\theta'_0 = \theta_0 - \left(\frac{\pi}{4} + \Delta\theta_{a1} + \frac{\delta}{2}\right) = \theta_r \quad (24)$$

<Filtering Calculation Unit 15>

The filtering calculation unit 15 takes in an angular signal $\theta_0$ from the angle calculation unit 14 as its input, and, by performing low-pass filter calculation processing of the angular signal $\theta_0$, calculates a post-filter angular signal $\theta$, which is then outputted.

A block diagram of specific processing in the filtering calculation unit 15 is illustrated in FIG. 10. In FIG. 10, a phase-error detection unit 17 takes in an angular signal $\theta_0$ and a post-filter angular signal $\theta$ described above as its inputs, and calculates an angular error $\Delta\theta$ from their difference. A proportional-integral calculation unit 18 takes in the angular error $\Delta\theta$ as its input, and outputs an angular velocity estimate value $\omega$ by means of proportional and integral calculations. An integral calculation unit 19 performs an integral calculation of the angular velocity estimate value $\omega$, and outputs a post-filter angular signal $\theta$.

FIG. 11 is a diagram illustrating an example of frequency characteristics of the filtering calculation unit 15. The horizontal axis indicates frequency; and the vertical axis, amplitude. In an angle detection region of the figure, the amplitude is one time, whereas the characteristics are given in which the amplitude attenuates in a high-frequency noise region where frequencies are high.

As shown in FIG. 12, in actual detection signals u, v and w, noise components are included which involve such frequencies, in a region of high-frequency noise which does not depend on an angle of the rotating body 9 described above, as a quantization error(s) at a time of AD conversion of an electric signal(s), high-frequency noise components flowing through a GND of an electrical circuit(s), and the like. For this reason, when there does not exist the filtering calculation unit 15, an angular inaccuracy becomes large due to noise.

By performing a filtering process on an angular signal $\theta_0$ by the filtering calculation unit 15 having the frequency characteristics of FIG. 11, it can be understood that, by attenuating frequencies of high-frequency noise components, an angular accuracy can be further enhanced in comparison with an angular signal $\theta_0$ on which the filtering process is not performed.

Next, examples of flowcharts each are illustrated from FIG. 5 to FIG. 8 for calculating a DC-offset correction value da0 of an aforementioned two-phase signal a0, a DC-offset correction value db0 of an aforementioned two-phase signal b0, an amplitude correction coefficient ka1 of the two-phase signal a0, an amplitude correction coefficient kb1 of the two-phase signal b0, an amplitude correction coefficient ka3, and an amplitude correction coefficient kb3. Note that, in FIG. 5 to FIG. 8, a program(s) may be executed when detectors are mounted on an electric motor of an electric automotive vehicle, and/or when the electric automotive vehicle is in operation, or in a process step while it is along a manufacturing line. In addition, in FIG. 5 to FIG. 8, it is so arranged that, in Embodiment 1, a program(s) is executed in a predetermined period, and that a start of the program(s) and an end thereof are repeated in a predetermined time interval.

First, the explanation will be made for the flowchart of FIG. 5.

A DC-offset learning determination flag of the signal correction unit 11, an amplitude learning determination flag of the signal correction unit 11 and an amplitude learning determination flag of the amplitude correction unit 13 are read in (Step ST101), and the processing proceeds to Step ST102. Next, in accordance with the DC-offset learning determination flag of the signal correction unit 11, the amplitude learning determination flag of the signal correction unit 11 and the amplitude learning determination flag of the amplitude correction unit 13, determination is performed whether the amplitude correction unit 13 reaches completion of amplitude learning (Step ST102). When the amplitude correction unit 13 reaches completion of amplitude learning, the processing proceeds to Step ST103, so that values acquired from FIG. 6 to FIG. 8 as will be described later are substituted into a DC-offset correction value da0 of a two-phase signal a0, a DC-offset correction value db0 of a two-phase signal b0, an amplitude correction coefficient ka1 of the two-phase signal a0, an amplitude correction coefficient kb1 of the two-phase signal b0, an amplitude correction coefficient ka3, and an amplitude correction coefficient kb3; and the processing is ended. When the amplitude learning of the amplitude correction unit 13 is not yet reached at its completion, the processing proceeds to Step ST104.

In accordance with the amplitude learning determination flag of the signal correction unit 11, determination is performed whether the signal correction unit 11 reaches completion of amplitude learning (Step ST104). When the signal correction unit 11 reaches completion of amplitude learning, the processing proceeds to Step ST105, so that values acquired from FIG. 6 to FIG. 7 as will be described later are substituted into a DC-offset correction value da0 of a two-phase signal a0, a DC-offset correction value db0 of a two-phase signal b0, an amplitude correction coefficient ka1 of the two-phase signal a0, and an amplitude correction coefficient kb1 of the two-phase signal b0, and that numeral "1" is substituted into an amplitude correction coefficient ka3, and an amplitude correction coefficient kb3, for each of them; and the processing is ended. When the amplitude learning of the signal correction unit 11 is not yet reached at its completion, the processing proceeds to Step ST106.

In accordance with the DC-offset learning determination flag of the signal correction unit 11, determination is performed whether the signal correction unit 11 reaches completion of DC-offset learning (Step ST106). When the signal correction unit 11 reaches completion of DC-offset learning, the processing proceeds to Step ST107, so that values acquired from FIG. 6 as will be described later are substituted into a DC-offset correction value da0 of a two-phase signal a0, a DC-offset correction value db0 of a two-phase signal b0, and that numeral "1" is substituted into an amplitude correction coefficient ka1 of the two-phase signal a0, an amplitude correction coefficient kb1 of the two-phase signal b0, an amplitude correction coefficient ka3, and an amplitude correction coefficient kb3, for each of them; and the processing is ended. When the DC-offset learning of the signal correction unit 11 is not yet reached at its completion, the processing proceeds to Step ST108, so that numeral "0" is substituted into a DC-offset correction value da0 of a two-phase signal a0, and a DC-offset correction value db0 of a two-phase signal b0, for each of them, and that numeral "1" is substituted into an amplitude correction coefficient ka1 of the two-phase signal a0, an amplitude correction coefficient kb1 of the two-phase signal b0, an amplitude correction coefficient ka3, and an amplitude correction coefficient kb3, for each of them; and the processing is ended.

Next, the explanation will be made for the flowchart of FIG. 6.

A DC-offset learning determination flag of the signal correction unit 11 is read in (Step ST201), and the processing proceeds to Step ST202. Next, in accordance with the DC-offset learning determination flag of the signal correction unit 11, determination is performed whether the signal correction unit 11 reaches completion of DC-offset learning (Step ST202). When the signal correction unit 11 reaches completion of the DC-offset learning, the processing is ended. When the signal correction unit 11 does not reach completion of the DC-offset learning, the processing proceeds to Step ST203; and at Step ST203, calculation processing of next Expression (25) and substitution processing thereof are performed, and the processing proceeds to Step ST204.

[Expression FIG. 25]

$$\text{sum\_}a0 \leftarrow \text{sum\_}a0 + a0(k)$$

$$\text{sum\_}b0 \leftarrow \text{sum\_}b0 + b0(k) \quad (25)$$

Here, symbol "k" designates the number of data after DC-offset learning is started; and symbols "sum_a0" and "sum_b0," variables for use in signal addition. When the DC-offset learning of the signal correction unit 11 is started (at a time when k=0), it is so arranged that the symbols "sum_a0" and "sum_b0" shown in the flowchart of FIG. 6 are individually reset to zero.

Next, numeral "1" is added to "k," which is then substituted into "k"; and the processing proceeds to Step ST205. When the number of data "k" reaches the number of data "n" being set in advance, the processing proceeds to Step ST206; and, when the number of data "k" does not reach the number of data "n" being set in advance, the processing is ended (Step ST205). At Step ST206, calculation processing of next Expression (26) and substitution processing thereof are performed, and the processing proceeds to Step ST207.

[Expression FIG. 26]

$$da0 \leftarrow \text{sum\_}a0/n$$

$$db0 \leftarrow \text{sum\_}b0/n \quad (26)$$

At Step ST207, numeral "1" is substituted for the determination of DC-offset learning in the signal correction unit 11 (in Embodiment 1, the definition is made in a program(s) that numeral "1" substituted into the DC-offset learning determination flag stands for completion of learning, and that numeral "0" substituted thereinto, for incompletion of learning), and the processing is ended.

Next, the explanation will be made for the flowchart of FIG. 7.

An amplitude-correction learning determination flag of the signal correction unit 11 is read in (Step ST301), and the processing proceeds to Step ST302. Next, in accordance with the amplitude-correction learning determination flag of the signal correction unit 11, determination is performed whether the signal correction unit 11 reaches completion of amplitude-correction learning (Step ST302). When the signal correction unit 11 reaches completion of amplitude-correction learning, the processing is ended. When the amplitude-correction learning of the signal correction unit 11 is not yet reached at its completion, the processing proceeds to Step ST303; and at Step ST303, calculation processing of next Expression (27) and substitution processing thereof are performed, and the processing proceeds to Step ST304.

[Expression FIG. 27]

$$\text{sum\_}a1 \leftarrow \text{sum\_}a1 + |a0(k) - da0|$$

$$\text{sum\_}b1 \leftarrow \text{sum\_}b1 + |b0(k) - db0| \quad (27)$$

Here, symbols "sum_a1" and "sum_b1" designate variables for use in signal addition. When amplitude-correction learning of the signal correction unit 11 is started (at a time when k=0), it is so arranged that the symbols "sum_a1" and "sum_b1" shown in the flowchart of FIG. 7 are individually reset to zero.

Next, at Step ST304, numeral "1" is added to "k," which is then substituted into "k"; and the processing proceeds to Step ST305. When the number of data "k" reaches the number of data "n" being set in advance, the processing proceeds to Step ST306; and, when the number of data "k" does not reach the number of data "n" being set in advance, the processing is ended (Step ST305). At Step ST306, calculation processing of the next expression and substitution processing thereof are performed, and the processing proceeds to Step ST307.

[Expression FIG. 28]

$$ka1 \leftarrow \text{sum\_}a1/n$$

$$kb1 \leftarrow \text{sum\_}b1/n \quad (28)$$

At Step ST307, numeral "1" is substituted into the amplitude-correction learning determination flag of the signal correction unit 11 (in Embodiment 1, the definition is made in a program(s) that numeral "1" substituted into the amplitude-correction learning determination flag stands for completion of learning, and that numeral "0" substituted thereinto, for incompletion of learning), and the processing is ended.

Next, the explanation will be made for the flowchart of FIG. 8.

An amplitude-correction learning determination flag of the amplitude correction unit 13 is read in, and the processing proceeds to Step ST402 (Step ST401). Next, in accordance with the amplitude-correction learning determination flag of the amplitude correction unit 13, determination is performed whether the amplitude correction unit 13 reaches completion of amplitude-correction learning (Step ST402). When the amplitude correction unit 13 reaches completion of amplitude-correction learning, the processing is ended. When the amplitude-correction learning of the amplitude correction unit 13 is not yet reached at its completion, the processing proceeds to Step ST403; and, at Step ST403, calculation processing of the next expression and substitution processing thereof are performed, and the processing proceeds to Step ST404.

[Expression FIG. 29]

$$\text{sum\_}a3 \leftarrow \text{sum\_}a3 + |a3(k)|$$

$$\text{sum\_}b3 \leftarrow \text{sum\_}b3 + |b3(k)| \quad (29)$$

Here, symbols "sum_a3" and "sum_b3" designate variables for use in signal addition. When amplitude-correction learning of the amplitude correction unit 13 is started (at a time when k=0), it is so arranged that the symbols "sum_a3" and "sum_b3" shown in the flowchart of FIG. 8 are individually reset to zero.

Next, at Step ST404, numeral "1" is added to "k," which is then substituted into "k"; and the processing proceeds to Step ST405. When the number of data "k" reaches the number of data "n" being set in advance, the processing proceeds to Step ST406; and, when the number of data "k" does not reach the number of data "n" being set in advance, the processing is ended (Step ST405). At Step ST406, calculation processing of next Expression (30) and substitution processing thereof are performed, and the processing proceeds to Step ST407.

[Expression FIG. 30]

$$ka3 \leftarrow \text{sum\_}a3/n$$

$$kb3 \leftarrow \text{sum\_}b3/n \quad (30)$$

At Step ST407, numeral "1" is substituted into the amplitude-correction learning determination flag of the amplitude correction unit 13 (in Embodiment 1, the definition is made in a program(s) that numeral "1" substituted into the amplitude-correction learning determination flag stands for completion of learning, and that numeral "0" substituted thereinto, for incompletion of learning), and the processing is ended.

As for each of values and coefficients of a DC-offset correction value da0 of a two-phase signal a0, a DC-offset correction value db0 of a two-phase signal b0, an amplitude correction coefficient ka1 of the two-phase signal a0, an amplitude correction coefficient kb1 of the two-phase signal b0, an amplitude correction coefficient ka3, and an amplitude correction coefficient kb3, it is difficult to acquire each of the values and coefficients in good accuracy by means of one-time processing from output signals of the rotation detectors 3a, 3b and 3c described in the embodiment. By performing program processing by means of predetermined procedures based on the flowcharts described above, it becomes possible to enhance the accuracy of values being calculated by acquiring, in stages, each of values and coefficients of a DC-offset correction value da0 of an aforementioned two-phase signal a0, a DC-offset correction value db0 of an aforementioned two-phase signal b0, an amplitude correction coefficient ka1 of the two-phase signal a0, an amplitude correction coefficient kb1 of the two-phase signal b0, an amplitude correction coefficient ka3, and an amplitude correction coefficient kb3 described in the embodiment. According to this arrangement, the accuracy of a post-filter angular signal $\theta$ and that of an angular signal $\theta_0$ can be enhanced.

Other Embodiments

The explanation will be made for other embodiments according to the present invention. A configuration of each of the embodiments described below is not limited to the configuration which is solely applied individually; it is also possible to apply a configuration by combining the configurations of other embodiments as far as there does not arise a contradiction.

Embodiment 2

FIG. 13 is a schematic block diagram of the signal processing device 6 in a rotation angle detection device 1 according to Embodiment 2. In Embodiment 1, the exemplary explanation is made for a case of the configuration that includes the multi-phase/two-phase transformation unit 10, the signal correction unit 11, the addition-subtraction calculation unit 12, the amplitude correction unit 13, the angle calculation unit 14, and the filtering calculation unit 15. However, when there exists no variation in DC offsets of the rotation detectors 3a, 3b and 3c, and when the characteristics of the amplitudes of the rotation detectors 3a, 3b and 3c are neatly adjusted with respect to a rotation angle of the rotating body 9, a configuration may be adopted in which the signal correction unit 11 is omitted as in FIG. 13; according to this arrangement, it is possible to obtain the effects similar to those in the rotation angle detection device 1 of Embodiment 1.

Embodiment 3

FIG. 14 is a schematic block diagram of the signal processing device 6 in a rotation angle detection device 1 according to Embodiment 3. The configuration is adopted in a signal processing device in which a multi-phase signal correction unit 16 is further added to the signal processing device 6 in Embodiment 1. Although a cancelling effect of electromagnetic noise "ξ" by means of the multi-phase/two-phase transformation unit may be decreased, a configuration may also be adopted as in FIG. 14 in which the multi-phase signal correction unit 16 as will be described later is provided in order to neatly adjust in advance a DC-offset value and an amplitude value with respect to each signal of the rotation detectors 3a, 3b and 3c, whereby it is possible to obtain the effects approximately similar to those in the rotation angle detection device 1 of Embodiment 1.

Embodiment 4

FIG. 15 is a schematic block diagram of the signal processing device 6 in a rotation angle detection device 1 according to Embodiment 4. The configuration is adopted in a signal processing device in which the signal correction unit 11 is omitted from the configuration of the signal processing device 6 in Embodiment 3. In a signal processing device in which, similarly to that of Embodiment 3, the multi-phase signal correction unit 16 is provided in order to neatly adjust in advance a DC-offset value and an amplitude value with respect to each signal of the rotation detectors 3a, 3b and 3c, a configuration may also be adopted as in FIG. 15 in which the signal correction unit 11 is omitted; however, it is possible to obtain the effects similar to those in the rotation angle detection device 1 of Embodiment 1.

Embodiment 5

In addition, when high-frequency noise included in actual detection signals u, v and w is small, a configuration may be adopted in that the filtering calculation unit 15 is omitted in all of the embodiments described above, and also that a signal "$\theta_0$" is taken as an angular output, whereby it is possible to obtain the effects similar to those in the rotation angle detection device 1 of Embodiment 1.

Next, the explanation will be made for the multi-phase signal correction unit 16.

<Multi-Phase Signal Correction Unit 16>

The multi-phase signal correction unit 16 takes in detection signals u, v and w from the rotation detectors 3a, 3b and 3c as its respective inputs; and, by performing calculation processing in accordance with Expression (31) and Expression (32) using a DC-offset correction value du0 of the detection signal u, a DC-offset correction value dv0 of the detection signal v, a DC-offset correction value dw0 of the detection signal w, and amplitude correction coefficients kuv1 and kuw1 of the detection signals u, v and w, the multi-phase signal correction unit outputs post-modification or post-correction detection signals u1, v1 and w1.

[Expression FIG. 31]

$$u' = u - du0$$

$$v' = v - dv0$$

$$w' = w - dw0 \tag{31}$$

[Expression FIG. 32]

$$u1 = u'$$

$$v1 = kuv1 \cdot v'$$

$$w1 = kuw1 \cdot w' \qquad (32)$$

Here, Expression (31) is the calculation for modifying DC-offset values of detection signals u, v and w; and Expression (32), the calculation for modifying amplitudes to be neatly adjusted between detection signals u, v and w with respect to the amplitudes after the DC-offset values have been modified.

In Expression (31), DC-offset values du0, dv0 and dw0 of the respective detection signals u, v and w are values arranged to be calculated in accordance with Expression (33), for example.

[Expression FIG.-33]

$$du0 = \left[ \sum_{k=0}^{n-1} u(k \cdot \Delta t) \right]/n \qquad (33)$$

$$dv0 = \left[ \sum_{k=0}^{n-1} v(k \cdot \Delta t) \right]/n$$

$$dw0 = \left[ \sum_{k=0}^{n-1} w(k \cdot \Delta t) \right]/n$$

Here, symbol "k" designates k-th data; symbol "$\Delta t$," a sampling period (an arbitrary fixed period in the embodiment); "$k \cdot \Delta t$," a time from a start of data acquisition; and symbol "n," a total number of data used for the calculation.

In Expression (32), amplitude correction coefficients kuv1 and kuw1 of the detection signals u, v and w are coefficients arranged to be calculated in accordance with Expression (34), for example.

[Expression FIG.-34]

$$ku1 = \left[ \sum_{k=n}^{2n-1} |u(k \cdot \Delta t) - du0| \right]/n = \left[ \sum_{k=n}^{2n-1} |u'(k \cdot \Delta t)| \right]/n \qquad (34)$$

$$kv1 = \left[ \sum_{k=n}^{2n-1} |v(k \cdot \Delta t) - dv0| \right]/n = \left[ \sum_{k=n}^{2n-1} |v'(k \cdot \Delta t)| \right]/n$$

$$kw1 = \left[ \sum_{k=n}^{2n-1} |w(k \cdot \Delta t) - dw0| \right]/n = \left[ \sum_{k=n}^{2n-1} |w'(k \cdot \Delta t)| \right]/n$$

$$kuv1 = ku1/kv1$$

$$kuw1 = ku1/kw1$$

Note that, in Expression (34), the amplitude correction coefficients kuv1 and kuw1 are acquired as arithmetic averages or means of absolute values using the detection signals u, v and w; however, the coefficients may be acquired as root-mean-square values using the detection signals u, v and w.

Next, examples of flowcharts each are illustrated from FIG. 16 to FIG. 18 for calculating a DC-offset correction value du0 of a detection signal u, a DC-offset correction value dv0 of a detection signal v, a DC-offset correction value dw0 of a detection signal w, and amplitude correction coefficients ku1, kv1 and kw1 of the respective detection signals u, v and w. Note also that, in FIG. 16 to FIG. 18, a program(s) may be executed when detectors are mounted on an electric motor of an electric automotive vehicle, and/or when the electric automotive vehicle is in operation, or in a process step while it is along a manufacturing line. In addition, in FIG. 16 to FIG. 18, it is so arranged that, in Embodiments 2 through 5, a program(s) is executed in a predetermined period, and that a start of the program(s) and an end thereof are repeated in a predetermined time interval.

First, the explanation will be made for the flowchart of FIG. 16.

A DC-offset learning determination flag of the multi-phase signal correction unit 16 and an amplitude learning determination flag of the multi-phase signal correction unit 16 are read in (Step ST501), and the processing proceeds to Step ST502. Next, in accordance with the amplitude learning determination flag of the multi-phase signal correction unit 16, determination is performed whether the multi-phase signal correction unit 16 reaches completion of amplitude learning (Step ST502). When the multi-phase signal correction unit 16 reaches completion of amplitude learning, the processing proceeds to Step ST503, so that values acquired from FIG. 17 to FIG. 18 as will be described later are substituted into a DC-offset correction value du0 of a detection signal u, a DC-offset correction value dv0 of a detection signal v, a DC-offset correction value dw0 of a detection signal w, and amplitude correction coefficients ku1, kv1 and kw1 of the respective detection signals u, v and w; and the processing is ended. When the amplitude learning of the multi-phase signal correction unit 16 is not yet reached at its completion, the processing proceeds to Step ST504.

In accordance with the DC-offset learning determination flag of the multi-phase signal correction unit 16, determination is performed whether the multi-phase signal correction unit 16 reaches completion of DC-offset learning (Step ST504). When the multi-phase signal correction unit 16 reaches completion of DC-offset learning, the processing proceeds to Step ST505, so that values acquired from FIG. 17 as will be described later are substituted into a DC-offset correction value du0 of a detection signal u, a DC-offset correction value dv0 of a detection signal v, and a DC-offset correction value dw0 of a detection signal w, and that numeral "1" is substituted into amplitude correction coefficients ku1, kv1 and kw1 of the detection signals u, v and w, for each of them; and the processing is ended. When the DC-offset learning of the multi-phase signal correction unit 16 is not yet reached at its completion, the processing proceeds to Step ST506, so that numeral "0" is substituted into a DC-offset correction value du0 of a detection signal u, a DC-offset correction value dv0 of a detection signal v, and a DC-offset correction value dw0 of a detection signal w, for each of them, and that numeral "1" is substituted into amplitude correction coefficients ku1, kv1 and kw1 of the detection signals u, v and w, for each of them; and the processing is ended.

Next, the explanation will be made for the flowchart of FIG. 17.

A DC-offset learning determination flag of the multi-phase signal correction unit 16 is read in (Step ST601), and the processing proceeds to Step ST602. Next, in accordance with the DC-offset learning determination flag of the multi-phase signal correction unit 16, determination is performed whether the multi-phase signal correction unit 16 reaches completion of DC-offset learning (Step ST602). When the multi-phase signal correction unit 16 reaches completion of DC-offset learning, the processing is ended. When the DC-offset learning of the multi-phase signal correction unit 16 is not yet reached at its completion, the processing proceeds to Step ST603, so that calculation processing of next Expression (35) and substitution processing thereof are performed, and the processing proceeds to Step ST604.

[Expression FIG. 35]

$$\text{sum\_}u \leftarrow \text{sum\_}u + u(k)$$

$$\text{sum\_}v \leftarrow \text{sum\_}v + v(k)$$

$$\text{sum\_}w \leftarrow \text{sum\_}w + w(k) \tag{35}$$

Here, symbol "k" designates the number of data after DC-offset learning is started; and symbols "sum_u," "sum_v" and "sum_w," variables for use in signal addition. When the DC-offset learning of the multi-phase signal correction unit 16 is started (at a time when k=0), it is so arranged that the symbols "sum_u," "sum_v" and "sum_w" shown in the flowchart of FIG. 17 are individually reset to zero.

Next, numeral "1" is added to "k," which is then substituted into "k"; and the processing proceeds to Step ST605. When the number of data "k" reaches the number of data "n" being set in advance, the processing proceeds to Step ST606; and, when the number of data "k" does not reach the number of data "n" being set in advance, the processing is ended. At Step ST606, calculation processing of the next expression and substitution processing thereof are performed, and the processing proceeds to Step ST607.

[Expression FIG. 36]

$$du0 \leftarrow \text{sum\_}u/n$$

$$dv0 \leftarrow \text{sum\_}v/n$$

$$dw0 \leftarrow \text{sum\_}w/n \tag{36}$$

At Step ST607, numeral "1" is substituted for the determination of DC-offset learning in the multi-phase signal correction unit 16 (in Embodiment 5, the definition is made in a program(s) that numeral "1" substituted into the DC-offset learning determination flag stands for completion of learning, and that numeral "0" substituted thereinto, for incompletion of learning), and the processing is ended.

Next, the explanation will be made for the flowchart of FIG. 18.

An amplitude-correction learning determination flag of the multi-phase signal correction unit 16 is read in (Step ST701), and the processing proceeds to Step ST702. Next, in accordance with the amplitude-correction learning determination flag of the multi-phase signal correction unit 16, determination is performed whether the multi-phase signal correction unit 16 reaches completion of amplitude-correction learning (Step ST702). When the multi-phase signal correction unit 16 reaches completion of amplitude-correction learning, the processing is ended. When the amplitude-correction learning of the multi-phase signal correction unit 16 is not yet reached at its completion, the processing proceeds to Step ST703, so that calculation processing of next Expression (37) and substitution processing thereof are performed, and the processing proceeds to Step ST704.

[Expression FIG. 37]

$$\text{sum\_}u1 \leftarrow \text{sum\_}u1 + |u(k) - du|$$

$$\text{sum\_}v1 \leftarrow \text{sum\_}v1 + |v(k) - dv|$$

$$\text{sum\_}w1 \leftarrow \text{sum\_}w1 + |w(k) - dw| \tag{37}$$

Here, symbols "sum_u1," "sum_v1" and "sum_w1" designate variables for use in signal addition. When amplitude-correction learning of the multi-phase signal correction unit 16 is started (at a time when k=0), it is so arranged that the symbols "sum_u1," "sum_v1" and "sum_w1" shown in the flowchart of FIG. 18 are individually reset to zero.

Next, numeral "1" is added to "k," which is then substituted into "k"; and the processing proceeds to Step ST705 (Step ST704). When the number of data "k" reaches the number of data "n" being set in advance, the processing proceeds to Step ST706; and, when the number of data "k" does not reach the number of data "n" being set in advance, the processing is ended. At Step ST706, calculation processing of next Expression (38) and substitution processing thereof are performed, and the processing proceeds to Step ST707.

[Expression FIG. 38]

$$ku1 \leftarrow \text{sum\_}u1/n$$

$$kv1 \leftarrow \text{sum\_}v1/n$$

$$kw1 \leftarrow \text{sum\_}w1/n \tag{38}$$

At Step ST707, numeral "1" is substituted into the amplitude-correction learning determination flag of the multi-phase signal correction unit 16 (in Embodiment 5, the definition is made in a program(s) that numeral "1" substituted into the amplitude-correction learning determination flag stands for completion of learning, and that numeral "0" substituted thereinto, for incompletion of learning), and the processing is ended.

Note that, as for a total number of data "n," it is suitable that the total number of data "n" is determined in such a manner that, by defining one period of the convex and concave sections 2a each of the rotor 2 as 360 degrees, a data range takes on the quantity of one period or more, and also takes on a period(s) in close vicinity to an integral multiple of 360 degrees as much as possible.

According to the configuration adopted as described above, an average value can be achieved by using data of the quantity of one period in varying periods owing to variations or the like in convex and concave shapes each of the convex and concave sections 2a of the rotor 2; and thus, it is possible to curb the increase of angular errors due to variations in convex and concave shapes each of the convex and concave sections 2a of the rotor 2, and/or due to variations of DC-offset correction values du0, dv0 and dw0, and those of amplitude correction coefficients kuv1 and kuw1 in which their variations are caused by a change(s) in relative positions between the rotor 2 and the rotation detectors 3a, 3b and 3c, so that it is possible to obtain an angular signal θ whose angle detection value is stable.

In the present invention, each of the embodiments can be freely combined, and/or each of the embodiments can be appropriately modified or eliminated without departing from the scope of the invention.

It should be noted that, as an example of hardware is illustrated in FIG. 19, the signal processing device 6 is constituted of a processor 100 and a storage device 101. The storage device is provided with a volatile storage device of a random access memory (RAM) or the like, and with a nonvolatile auxiliary storage device of a flash memory or the like, which are not shown in the figure. In addition, in place of the flash memory, an auxiliary storage device of a hard disk may be provided with. The processor 100 executes a program(s) inputted from the storage device 101. In this case, the program(s) is inputted into the processor 100 from the auxiliary storage device by way of the volatile storage device. Moreover, the processor 100 may output its data of a calculated result(s) or the like into the volatile storage device of the storage device 101, or may store the data into the auxiliary storage device by way of the volatile storage device.

Explanation of Numerals and Symbols

Numeral "1" designates a rotation angle detection device; "6," signal processing device; "10," multi-phase/two-phase transformation unit; "11," signal correction unit; "12," addition-subtraction calculation unit; "13," amplitude correction unit; "14," angle calculation unit; "15," filtering calculation unit; and "16," multi-phase signal correction unit.

What is claimed is:

1. A rotation angle detection device, comprising:
    a multi-phase/two-phase transformer configured to convert a plurality of detection signals, each being outputted from rotation detectors in accordance with a rotation angle of a rotating body, so as to output transformed signals as two-phase signals, wherein a number of the plurality of detection signals is 3 or more;
    a signal corrector configured to modify the two-phase signals by using at least one of DC-offset values and amplitude values, each of the DC-offset values and the amplitude values being calculated based on one-or-more-period signals of the two-phase signals;
    an addition-subtraction calculator configured to receive the two-phase signals which have been modified, and generate addition-subtraction signals by mutually performing addition to the two-phase signals and subtraction therefrom;
    an amplitude corrector configured to modify amplitudes of the addition-subtraction signals in accordance with an amplitude correction value, and output post-correction addition-subtraction signals; and
    an angle calculator configured to calculate an angle based on the post-correction addition-subtraction signals, and output an angular signal,
    wherein the DC-offset values calculated based on the one-or-more-period signals of the two-phase signals are respectively defined as arithmetic mean values over the one-or-more-period signals of the two-phase signals.

2. The rotation angle detection device as set forth in claim 1, further comprising a multi-phase signal corrector configured to modify the plurality of detection signals, each being outputted from the rotation detectors in accordance with the rotation angle of the rotating body, by using at least any one of DC-offset values and amplitude values, each of the DC-offset values and the amplitude values being calculated based on one-or-more-period signals of the plurality of detection signals, and output, as inputs into the multi-phase/two-phase transformer, post-correction detection signals having been modified.

3. The rotation angle detection device as set forth in claim 2, wherein said one-or-more-period signals includes signals acquired in each of fixed periods being set in advance.

4. The rotation angle detection device as set forth in claim 1, wherein the amplitude correction value of the amplitude corrector is defined as a ratio between arithmetic mean values over one-or-more-period signals of the addition-subtraction signals, or as a ratio between root-mean-square values over one-or-more-period signals of the addition-subtraction signals.

5. The rotation angle detection device as set forth in claim 1, further comprising a filtering calculator configured to output, as a post-filter angular signal, a signal whose filtering process is performed on the angular signal from the angle calculator.

6. A rotation angle detection device comprising:
    a multi-phase/two-phase transformer configured to convert a plurality of detection signals, each being outputted from rotation detectors in accordance with a rotation angle of a rotating body, so as to output transformed signals as two-phase signals, wherein a number of the plurality of detection signals is 3 or more;
    a signal corrector configured to modify the two-phase signals by using at least any one of DC-offset values and amplitude values, each of the DC-offset values and the amplitude values being calculated based on one-or-more-period signals of the two-phase signals;
    an addition-subtraction calculator configured to receive the two-phase signals which have been modified, and generate addition-subtraction signals by mutually performing addition to the two-phase signals and subtraction therefrom;
    an amplitude corrector configured to modify amplitudes of the addition-subtraction signals in accordance with an amplitude correction value, and output post-correction addition-subtraction signals; and
    an angle calculator configured to calculate an angle based on the post-correction addition-subtraction signals, and output an angular signal,
    wherein the amplitude values are respectively defined as absolute values' arithmetic mean values over one-or-more-period signals of signals in which the DC-offset values are subtracted from the two-phase signals, or as root-mean-square values over one-or-more-period signals of signals in which the DC-offset values are subtracted from the two-phase signals.

* * * * *